(12) United States Patent
Wilson

(10) Patent No.: US 11,993,460 B2
(45) Date of Patent: May 28, 2024

(54) MOBILE AND TRANSFERABLE TELESCOPING CONVEYOR APPARATUS AND PROCESS

(71) Applicant: Neil Wilson, Addison, IL (US)

(72) Inventor: Neil Wilson, Addison, IL (US)

( * ) Notice: Subject to any disclaimer, the term of this patent is extended or adjusted under 35 U.S.C. 154(b) by 0 days.

(21) Appl. No.: 17/100,479

(22) Filed: Nov. 20, 2020

(65) Prior Publication Data
US 2021/0139246 A1    May 13, 2021

Related U.S. Application Data

(63) Continuation-in-part of application No. 16/447,411, filed on Jun. 20, 2019, now abandoned, which is a continuation-in-part of application No. 16/028,100, filed on Jul. 5, 2018, now abandoned.

(51) Int. Cl.
| | |
|---|---|
| *B65G 21/14* | (2006.01) |
| *B65G 41/00* | (2006.01) |
| *B65G 47/18* | (2006.01) |
| *E04G 21/16* | (2006.01) |
| *B60K 25/00* | (2006.01) |
| *B60P 1/64* | (2006.01) |

(52) U.S. Cl.
CPC .......... *B65G 21/14* (2013.01); *B65G 41/005* (2013.01); *B65G 47/18* (2013.01); *E04G 21/16* (2013.01); *B60K 25/00* (2013.01); *B60P 1/6418* (2013.01)

(58) Field of Classification Search
CPC .... B65G 21/14; B65G 41/005; B65G 41/002; B65G 15/26
See application file for complete search history.

(56) References Cited

U.S. PATENT DOCUMENTS

| | | | | |
|---|---|---|---|---|
| 1,453,393 | A | * | 5/1923 | Jessen ..................... B65G 21/14 198/313 |
| 2,720,326 | A | * | 10/1955 | Horkheimer ......... B65G 65/425 198/606 |
| 3,341,029 | A | * | 9/1967 | Barkley ................ B66C 23/703 212/350 |
| 3,596,785 | A | * | 8/1971 | Weatherford, Jr. .... B65G 21/14 198/812 |
| 4,168,008 | A | * | 9/1979 | Granryd ................ B66C 23/701 212/350 |
| 4,624,357 | A | * | 11/1986 | Oury ...................... B65G 21/14 198/313 |
| 5,498,119 | A | * | 3/1996 | Faivre ...................... B60P 1/36 198/313 |

(Continued)

*Primary Examiner* — William R Harp
(74) *Attorney, Agent, or Firm* — John P. Luther

(57) ABSTRACT

Provided is a portable conveying system mounted on a class 5 operable pickup truck rolling chassis with engine and transmission components for conveying material to a desired site comprising, a hydraulically operated telescopable conveying unit of a plurality of individual sections nesting in each other or extending out from each other when telescoping and an internal extendable and retractable conveying belt situated within said telescoping conveying unit, and operated manually or remotely controlled by PTO function of the pickup truck chassis engine, and wherein said individual telescoping sections are moveable relative to each other by rolling and/or sliding on polymeric slidable surfaces.

10 Claims, 15 Drawing Sheets

(56) References Cited

U.S. PATENT DOCUMENTS

| | | | | |
|---|---|---|---|---|
| 5,685,416 A * | 11/1997 | Bonnet | ................ | B65G 21/14 |
| | | | | 198/812 |
| 5,984,077 A * | 11/1999 | Frye | ........................ | B60P 1/36 |
| | | | | 198/317 |
| 6,283,269 B1 * | 9/2001 | Mayer | ................ | B65G 41/005 |
| | | | | 198/313 |
| 8,186,502 B2 * | 5/2012 | Mackin | ................ | A01D 57/20 |
| | | | | 198/805 |
| 8,506,232 B2 * | 8/2013 | Gallione | ............ | B65G 41/005 |
| | | | | 414/505 |
| 10,538,391 B2 * | 1/2020 | Bratton | ................ | B65G 21/14 |
| 10,913,381 B2 * | 2/2021 | Bacon-Maldonado, III | ................ | |
| | | | | B65G 41/002 |
| 2019/0256297 A1 * | 8/2019 | Bacon-Maldonado, III | ................ | |
| | | | | B65G 41/002 |

* cited by examiner

Weight per section:

| | |
|---|---|
| 22" section = | 996 LB |
| 20" section = | 657 LB |
| 18" section = | 484.5 LB |
| 16" section = | 343.5 LB |
| 14" section = | 225 LB |

| | |
|---|---|
| 17" BELT 1' = | 0.97 LB/FT |
| 17" Poly liner 1' = | 1 LB/FT |
| Cable: 1' = | 1/2 LB/FT |

Retracted to Compact/Transit Form

MOBILE AND TRANSFERABLE TELESCOPING CONVEYOR APPARATUS AND PROCESS

PRIORITY

This application is a continuation-in-part application of U.S. Ser. No. 16/447,411, entitled pickup truck mounted telescoping conveyor filed Jun. 20, 2019, and for which this application claims priority.

FIELD OF THE INVENTION

The invention is directed to a compact mobile and transferrable mounted telescopic belt conveyor apparatus, method, system and method of manufacture, and in which can be mounted on any available rolling chassis, such as a truck which is of a size and class not requiring a commercial driver's license and/or specialized permitting or DOT requirements, on may be utilized by itself, such as on any trailerable and/or moveable platform to be brought to a work site as contemplated, and due to its compact size is capable of accessing areas of desired use activity which many conventional truck or vehicle mounted or mountable telescoping conveying apparatuses cannot access. The invention is also directed to such removable and transferable conveying apparatus which has a unique advantage of individual conveyed sections moving and delivering individual weight conveying capacities with individual extension capacities providing for extensive flexibility of use not hereto are available.

BACKGROUND OF THE INVENTION

As discussed in prior applications U.S. Ser. No. 16/028,100 and U.S. Ser. No. 16/447,411, large vehicle mounted or vehicle mountable conveying telescoping apparatuses have been known and in use for a number of years, as such are preferred or even necessary for use in the construction industry and many other areas.

For example, U.S. Pat. No. 3,945,484 discloses a multiple, variable length conveyor system having at least two conveyor frames, one conveyor frame movable parallel to the other frame, in which a single, slack-free conveyor belt is positioned in combination with both frames and passes in a continuous loop forward from the back of the top conveyor to the front thereof, back from the front of the top conveyor to the back of bottom conveyor, forward from the back of the bottom conveyor to the front thereof and back over the front of the top conveyor to the back thereof to complete the loop. This single belt system permits relative movement between the conveyor frames from a collapsed state to an extended state and obviates the need for separate conveyor belts for each conveyor frame. This system is said to be particularly applicable to multiple, variable length conveyors for conveying concrete, such as multiple conveyors positioned above the extendible boom of a crane-type wheeled vehicle. In the extended state, a portion of the belt is carried along the bottom conveyor on substantially non-binding idler assemblies which permit the engagement and disengagement of the conveyor belt and bottom conveyor during movement between the collapsed and extended states of operation. The apparatus employs very large crane-type wheeled vehicles equipped with outriggers.

U.S. Re. 29,110 discloses a conveying means being mounted on an extensible boom of a wheeled vehicle in such manner that one end of the conveyor system is adapted to receive materials such as concrete or the like from a delivery truck and the other end is adapted to discharge the materials, as through a tremie, into a wall form or the like. The arrangement is such that the boom of the wheeled vehicle can be extended and retracted, inclined and swung from side to side during a continuous materials delivery operation so that the tremie can follow the outline of the wall form for evenly distributing the materials therein. The extension, elevation and wing of the boom can be effected by the operator without interrupting the flow of materials, and a filling job is said to be completed in a minimum of time.

U.S. Pat. No. 4,624,357 discloses an over-the-road large vehicle having a pivotally-mounted telescoping boom which moves in and out, up and down, and from side to side. An extensible concrete conveyor belt is mounted on the boom for movement with the boom for conveying and placing concrete within the reach of the boom. The vehicle is equipped with stabilizing outriggers which are pivotally mounted on the vehicle and can be folded back in nesting relation to minimize the width of the vehicle during transit. The vehicle also carries a separate belt conveyor for feeding concrete to the extensible conveyor, the discharge end of said separate conveyor being mounted on arms which fold down to reduce the overall height of the vehicle during transit.

U.S. Pat. No. 5,203,442 discloses a self-propelled vehicle mounting a cantilevered conveyor truss for concrete and the like. A force balancing frame enables the vehicle to remain stable even though the truss conveyor is extended to maximum length and elevated to a high angle. Improved geometry is said to enable the truss conveyor to be pivoted at a point above a cab mounted on a turntable of the vehicle and forward of the axis of rotation of the turntable to facilitate the deposit of concrete on the conveyor. Polyethylene pads control the motion of the truss conveyors, especially when the truss conveyor is elevated to a high angle. A drive assembly enables a mid-section and fly section of the truss conveyor to be moved simultaneously with respect to a base section of truss conveyor such that the fly section moves at twice the rate of the mid-section.

U.S. Pat. No. 6,378,686 also discloses a vehicle-mounted conveyor system, and including an infeed conveyor assembly mounted for powered rotation relative to the vehicle. The conveyor system includes a discharge conveyor assembly pivotally mounted to a main turret, which in turn is mounted to a primary turntable for powered rotation relative to the vehicle. The discharge conveyor assembly includes a telescoping boom and a moving discharge conveyor belt to supply an aggregate material, such as concrete, to a desired point at the work site. An infeed conveyor assembly is rotatably mounted to the main turret by a powered secondary turntable. The powered secondary turntable is mechanically driven by a drive mechanism, such that the infeed conveyor assembly can be rotated relative to the main turret. The secondary turntable and the primary turntable are independently operable and rotate about a common vertical axis, such that the infeed conveyor assembly and the discharge conveyor assembly can be independently rotated relative to the vehicle.

U.S. 2005/0279616 A1 discloses an extendible conveyor system (ECS) that allows material to be transported from a low plane, such as a truck bed, onto a high plane, such as a rooftop. The ECS has the ability to extend its length via the use of hydraulics to increase its reach enabling the conveyor to carry material further distances. The material may be fed continuously at a rate selected by the operator. The ECS employs a Dual Ram Stem at its base to allow the base to raise and lower for the easier loading of material onto the conveyor at the truck bed end. No mention is made of suitable vehicles or trucks capable of mounting and operating the conveyor system or how such can be accomplished.

U.S. Pat. No. 8,506,232 discloses a vehicle mounted conveyor system including a chassis, engine and wheels, and further comprising a rotating main turret; an outflow conveyor mounted on the main turret and configured to be rotated relative to the vehicle through rotation of the main turret; a feed turret assembly configured for vertical movement between a lowered storage position and a raised operational position, the feed turret assembly configured for vertical movement between a lowered storage position and a raised operational position, the feed turret assembly configured for rotation independent of and relative to the main turret; a feed conveyor configured to be rotated relative to the vehicle through rotation of the feed turret assembly, a discharge end of the feed conveyor connected to the feed turret assembly and positioned above the outflow conveyor when the feed turret assembly is in a raised operational position; and wherein when the feed turret assembly is in a raised operational position material being carried along the feed conveyor is deposited from the discharge end of the feed conveyor downward onto the outflow conveyor and transferred along the outflow conveyor to the distal end. Outriggers are employed to stabilize the apparatus. Only large commercial trucks, such as the international 7500 SBR 6×4 are said to be suitable for use with this conveyor system.

In still another example, U.S. Pat. No. 9,783,093 discloses a truck mounted conveyor system for transporting building materials to a station remote from the truck. The truck with conveyor system comprises a base platform mounted to the truck frame and an inner boom pivotally mounted to the base platform and configured to extend outward of said bed platform over a range of elevations and azimuths. The outer boom is pivotally secured to the inner boom with a continuous conveyor belt circumscribing the inner and outer booms. The inner boom includes a tensioner mechanism for maintaining a predetermined tension in the conveyor belt wherein the combination of inner boom and outer boom can be configured to minimize the overall length of the conveyor system while in transit in order to comply with applicable state overall vehicle length regulations and also maximize conveyor system length during conveying operations. Again, only large commercial trucks are disclosed as suitable for mounting and operation of the conveyor system.

Thus, as shown, there exists a wide void in availability for desirable compact mobile pickup trucks mounted telescoping conveyor apparatuses, methods and systems in which the truck chassis is of a size and class not requiring a commercial driver's license and/or specialized permitting and DOT requirements, and which is capable of accessing areas of desired activity which cannot be accessed by conventional truck or vehicle mounted telescoping conveying apparatuses. The invention fills such a void and long desired need and capability.

SUMMARY OF THE INVENTION

The invention provides a compact mobile pickup truck mounted telescopic belt conveyor apparatus which has comparable capabilities and capacities to conventional machines, and which employs reduced conveying belt or equipment size, such as, for example, approximately ¼ the size and ¼ the weight of such conventional machines, and for which provides for drastic size and weight reduction allowing for a comparatively small size of apparatus, but with conventional capacity for materials placement.

The invention is more fully described and understood with reference to the following Detailed Description of Preferred Embodiments and FIGS.

DETAILED DESCRIPTION OF THE PREFERRED EMBODIMENTS

Figure 1:
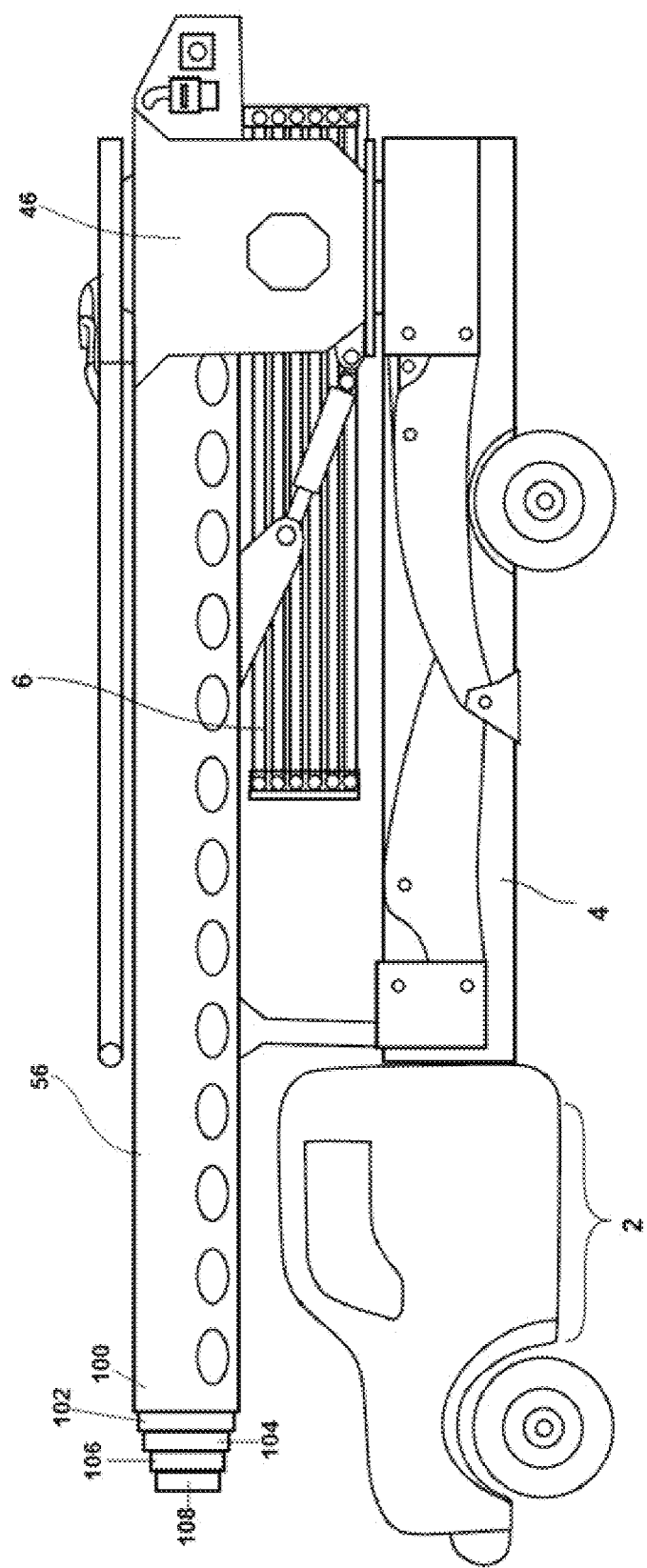
FIG. 1 illustrates a perspective view of preferred embodiment of the invention.

A preferred embodiment of the inventive compact mobile pickup truck mounted telescoping belt conveyor apparatus is shown in FIGS. 1-18.

The following described preferred exemplified embodiments of equipment provide for a unique and individual standing piece of equipment heretofore not available, but yet highly desired. Exemplified is the smallest, lightest and most versatile concrete, gravel and materials placement piece of equipment yet known. By way of construction and description there is nothing of any substance on the exemplified equipment that is subject to rust, as the material placing apparatus is preferably essentially completely aluminum, including the truck cab and polymeric material for use as belt gliding material.

Key materials in the designing of the inventive equipment is a combination of employing aluminum along with polymeric materials, which are enabling of very light weight equipment and also enabling for ease of movement with a dry lubricant for use with polymer. The use of these two materials working along with each other allows for a very tight tolerance of dimensions in the telescoping design of a conveying belt, or otherwise referred to herein as a "Telly-belt". Without such combination, tolerances would have to be undesirably much greater. Such unique inventive design allows for the enabling of a piece of equipment that is a quarter of the size of what is conventional therein providing for many unique advantages. For example, conventional units may weigh 80,000 pounds compared to the inventive apparatus which may be approximately 19,500 pounds. Further, conventional truck mounted mobile conveyors are typically around 14'-16' in height, and 65' in length and have twice as many tires, with an example inventive truck design in comparison around only 26 feet long by 9'10" in height.

This size reduction without any lost capacity provides may advantages in fuel savings, in maintenance costs, environmental impact, etc. as explained more fully below. The conveyor belt which may slide on polymeric material facing, may be composed of, for example, a rubber/nylon material, which allowed for considerable weight reduction, such as, for example, about $\frac{1}{20}$ of that of conventional apparatus (approximately 190 lbs v. approximately 3,800 to 4,000 lbs). All components are designed to be as light weight and durable as possible. Efficiency is important, along with durability for longevity of use of this equipment. The design has maintenance in consideration with all aspects of design and functionality. Safety to operators, balancing and center of gravity are built into design considerations with friendliness to use for longevity of employment of the operator.

The inventive equipment is also designed to be easily detached by unbolting in one preferred example 10 bolts that fasten such equipment to a chassis cab of the purchaser's choice. This may be a pickup truck chassis, or cab over, such as described, for example, in U.S. application Ser. No. 15/599,104 the entirety of which is incorporated herein by reference. A main purpose for the construction of the inventive equipment is to bring to the construction placement industry a smaller, lighter, more affordable and more efficient method to move a piece of placement equipment around sites in a much more compact efficient way, and to access places where conventional designs simply cannot go. For example, in one inventive design aspect, as mentioned above, a conveyor belt may be employed, as made possible by the inventive design, that weights a mere approximately 190 lbs compared to conventional belts that weight somewhere around 9,000 lbs, or approximately a $\frac{1}{20}$ weight difference. In short, the inventive equipment provides for major advantages in the placement industry.

Construction of one preferred embodiment of the inventive conveyor truck is described as follows. With reference to U.S. Ser. No. 15/599,104, the Ford F550 Diesel 6.7 is a preferred choice to provide a powered rolling chassis with which to construct the inventive conveyor apparatus. A cab over may also be used very easily. Three key points to the construction and design of this truck are preferably met to maximize advantages. These are 1) weight of material along with the strength of the material; 2) the extension and retraction of the telly belt system from, for example, a 100 foot length slides into itself to approximately a 24 foot length or less; and 3) a unique serpentine belt design that allows, for example, a 100 foot telescoping design to continuously stay moving while being held in a sliding roller serpentine design track system, preferably a 6-7 roller design, beneath the main conveyor belt section. There may also be a pulley arm help support pole system that might be desired to be used and is designed to help take desired load off of the end sections for deflection control using hydro winches, such as 2000 lbs capacity.

With reference now to a preferred embodiment of a construction process, a starting point of the construction of the truck is construction of a back pedestal mount plate, where the pedestal attaches to the truck main frame of the selected rolling chassis. In this preferred example, this truck design has five triangular sections that slide into one another via a polymer dry glide material and comprise the telescoping apparatus component of the invention. This telescoping component pivots from a main fixed section, and pivots off a 3" shaft, and preferably with brass bushing inserts for the installation of a telescoping extension system, to be attached to a main vertical turntable structure. Preferably all of the welds that are done to the vertical main support pieces are welded inside and outside to better insure structural strength and integrity. These vertical pieces are then preferably bolted with grade 8 or 9 bolts vertically and horizontally to the very bottom pedestal plate. The connection of the vertical main support side pieces is preferably bolted at the bottom connection point, as such is a high torque distortion point that is stronger and more sustainable with a bolt design system. These are through bolted through the mounting plate. All grade 8 steel bolts are preferably coated with anti-corrosion paste to stop undesirably electrolysis from occurring between different materials used.

Next, a base is manufactured and situated for the above-mentioned apparatus to sit on a turntable slewing bearing assembly which is bolted between the pedestal and the plate for the vertical structure. These parts of the apparatus are all preferably fabricated by water-jet cutting or laser cutting from a 1" thick piece of aluminum material. Thickness understandably may vary depending upon such factors as contemplated use and applications. Such parts are preferably fabricated by water jet cutting or laser cutting, so not to affect the integrity of the material by the heat that would be generated by torch cutting. This method of fabrication also insures that all pieces are cut in uniform fashion, as attained by AutoCAD or DXF file program.

The base the slewing bearing assembly is bolted to a turntable section as described above. The slewing bearing is preferably designed with the load capacity of approximately 250,000 foot pounds. Inside of this base component are situated structural cross members that insure no distortion or deflection, or at least a minimum of distortion or deflection, when the upper rotatable base plate is rotating. All welds are preferably both external and internal for integrity and strength. Access to the inside of this base component may be made possible via hatch openings. The shape of this base is preferably chosen in the configuration or a radius wave shape for increased strength. The main rear out rigger arms may be connected to the bushings at the ends of each corner of this base.

The outrigger arms preferably have 5"×24" hydraulic cylinders to raise and lower the arms to the ground. Also on the rear out rigger sections may be installed extension sections that slide from internal portions of the arms preferably out approximately 30" or so to provide a more stable footprint for the truck. On the end of the extensions may be provided swivel foot pads that are in contact with the ground or other work or activity surface.

Next is described a preferred embodiment for the construction of the actual lineal section connecting the rear base section to front outrigger section. This middle section is preferably 20" high by 8' 6" long by 34" wide. The width of this structure is a universal track rail width, and which allows for installation on the desired chassis cab as contemplated. A hydraulic fluid tank is preferably situated in this section which may be, for example, approximately 50 gallons capacity. A water tank may also be placed in this section, such as a hundred gallons capacity. Also, in this section is preferably situated the connection of a back pedestal section and a front out rigger section, which is designed to prevent or at least substantially reduce any deflection and/or twisting of the truck frame. This section is also preferably welded internally and externally for strength and integrity with its internal cross members.

The final preferred embodiment component to the main conveyor mounting platform is the front out rigger section component. There are bottom and top plates in this section which are also preferably 1" thick, and fabricated by water jet cutting or laser cutting to avoid problems associated with heat distortion, such as described as above. The outriggers are connected to a pedestal situated in between the top and bottom plates preferably with split brass bushings to allow for smooth and longevity of wear in its pivoting process. Once these three individual pieces are constructed, they may now be connected to one another by also once again welding top face and bottom face together. These welds are preferably done with a V groove or beveled edge to allow for deep weld penetration into one another. Preferably, all welds that are done on any part of the truck component should be of deep weld penetration to reduce any chance of weld failures. Robotic welding is also contemplated for commercial manufacture. After the three parts are connected to make one main base platform, the assembly may be bolted to the rolling truck chassis. This is done preferably by 8 Grade 8 bolts, approximately 26" long, that bolt through the front out rigger pedestal and the rear turn table pedestal from the top plate through the bottom plate to a three-quarter inch mounting plate that is bolted to the main frame. Anti-electrolysis paste should be used because of the different metals employed. There may be also provided a midpoint bracket that attaches on both sides of the truck frame. This completes the main deck platform fabrication and installation on the desired truck chassis. The sequential fabrication of the various assemblies and joining together as discussed is the preferred fabrication process and method although other embodiments and equivalents are contemplated.

The next part of the process is fabrication of the out rigger front and rear sections. With these sections there is a fixed swivel straight section with split bushing at each pivot point. The front out rigger section is preferably approximately 16" in length with a common pivot arm that is used for all out rigger pieces. That arm may have, for example, a 5"×24" hydraulic cylinder that pivots off the straight main section to the ground. Rear out rigger sections are the same with respect to function with the change of the straight section approximately 42" long. A pivot arm that extends to the ground or work surface is common to the rest of the truck. This arm may have a slide out extension arm of approximately 30" with a footpad attachment on its end. This allows for an extra-large footprint for the conveyor truck.

Next is described the fabrication of the five telescoping triangular sections responsible for conveying action. These may vary from, for example, 22" all the way down to 14" for the width of each triangle section. This allows for a 3/8" spacing between each sliding section to allow for the polymeric coating sliding system. Preferably, the polymer employed is a dry glide material, which has a dry lubricant added to the polymer. This makes for a very hard slippery gliding material. Without employing the polymeric material, this process may not function with desired efficiency. Inside the sections is also provided a pulley cable system that is connected to a hydraulic extension and traction motor installation, which allows for movement of the triangular sections telescoping system. The pulley cable system comprises what is referred to as the "serpentine belt" system of the invention on which materials to be placed are conveyed. There are also preferably installed stops to prevent over extension of sections. In each of these sections is placed polymer material, which can be used as desired (but not necessary) on all corners internal and external for desired efficiency. All polymer material may be attached by stainless steel screws that are taped in a set pattern, so each of these pieces may be replaced in maintenance individually, for the ease of maintenance. Another method would be to attach with adhesive backing. Concrete or other material placement belts also slide on this polymer. There is also a polymer track that the main belt slides on that is one of the continuous 16' approximate lengths that slide into themselves. This allows for a continuous collapsible bottom track that can be 25' or 100' long seamlessly. Precision in the welding together of each side piece to fabricate the triangular shape of each extendable section is important. Precision should be exact as possible with essentially no differences in dimensions. This allows for efficiency in the slide and glide effect.

A key component of the inventive conveyor truck design is the serpentine retracting sliding roller system. This roller system is in a track framework which is mounted to the bottom outer edge of the first main telly belt section. This track system is mounted or fastened only to the first main section which allows for this track to float in between the rear pedestal framework. In a preferred example, this framework system is approximately 13' 6" feet long and 20" wide by 25" in height. There are usually 6 or 7 rollers on either end of this track, which roll on double polymer rollers top and bottom of the 7 roller bracket. These 7 rollers are attached in series approximately 4 inches on center, and glide along this track in a manner that allows the belt to extend and retract the telescoping triangular sections as desired. When the rollers extend down their roller track towards the front of the cab from the rear of the pedestal, the telescoping belt sections are retreating back in retraction to the rear of truck. The opposite occurs when conveyor belt sections are extending out to the approximate hundred foot lengths, in which the 7 rollers in series are retracting to the rear pedestal bracket system. This serpentine belt design system will allow for continuous belt movement and placement of concrete, gravel or any material to any length that is desired. This unique design provides for unparalleled advantages, in allowing for the belt system to be contained in a very small, compact portion of the truck and for making possible a very compact unit which may be used on relatively small truck chassis of the invention, not heretofore possible with conventional designs. Conventional designs employ a roller system for extension and retraction of their telescoping system. In contrast, the inventive design employs a design that consists of slide and glide movement of a belt and extension system. This allows for a very efficient and easily maintained product. The tolerance of spacing is preferably a 3/16" to 1/4" for all sliding extendable/retractable sections, which has been found to reduce deflection of the extension of the system. The closer the tolerances, the less play there is between each section. Also, the material that is used on the conveyor belt itself is preferably of a nylon backed material with a rubber face, which allows for the nylon surface to preferably, in one embodiment, ride on polymer glide tracks, while still able to use a rubber face of the belt for better ware durability. This type of belt material reduces the belt weight by approximately 1/20 the weight compared to conventional designs. All materials that are used on the inventive truck design are as lightweight as possible to reduce all excess weight and for ease of maintenance.

Further, with respect to the concrete conveyor belt, when coming off the main drive roller the belt should be shaped into a V shape to fit inside of the triangular shaped telescoping sections. This may be accomplished by an adjustable bracket such that the rollers may be configured in a way that starts to flex the belt into the shape of the inside dimension of the telescoping triangle shape of the telly belt framework. This bracket design also should be used at the very end section to relieve the belt into a flat horizontal end tip roller. At the end tips section there is preferably provided a deflection guard tip section, and funnel attached to allow for concrete or conveyed material to drop vertically into a flexible hose to allow for concrete or conveyed material to be placed onto the ground. There is also preferably provided a concrete scraper that is attached to back edge of and tip roller that is used to scrape off excess concrete returning back to rear of truck.

The next area described is the optional employment of a feeder belt that brings concrete from the discharge of a mixer truck on to a hopper at the end of a foldable and swiveling feeder belt system. This feeder belt is attached above and at the start of the main roller drive which is attached at the beginning point of the mounting system. There is a mounting bracket that bolts to a 28" non-sprocketed slewing bearing just in front of and above the main drive roller. This will allow for the discharge of concrete or other material from the feeder belt through the opening/ID of this bearing down on to the lower main concrete feeder belt. With this telescopic, or otherwise retractble, feeder belt mounted to this bracket at the bearing, with a pivot point at the bracket, the belt is allowed to hinge downward with one or two actuator cylinders mounted to this bracket. These actuator cylinders are used for up and down movement for the ease of the extension and placement into position of the feeder belt. With the feeder belt extended into its position, at the very end is a hopper with legs underneath it to support weight for the discharge of concrete or conveyed material onto the hopper. With this design, the feeder belt may be folded and stored on top of the main telly section. The design of this prepared 5"×1/8" aluminum 2-piece component is for ease of maintenance and reduced weight. The inventive design is much more compact in design, allowing for a lower profile for the truck mounted apparatus and less height, and thus making possible use of a small truck chassis of the invention.

There are also situated hydraulic control motors with valves and hydraulic pumps, and gearbox placement along with a water pump/pressure washer. Remote control of any element assembly is also contemplated, such as by RF or Bluetooth. As may be seen, the inventive compact unit may be employed on any "off the lot" consumer truck not requiring specialized operator's licensing and/or permitting or DOT requirements, and due to size and weight will permit access to any desired activity site where conventional products will not be able to gain access.

Turing now to the FIGS. there is shown several non-limiting preferred embodiments of the invention.

Figure 2:
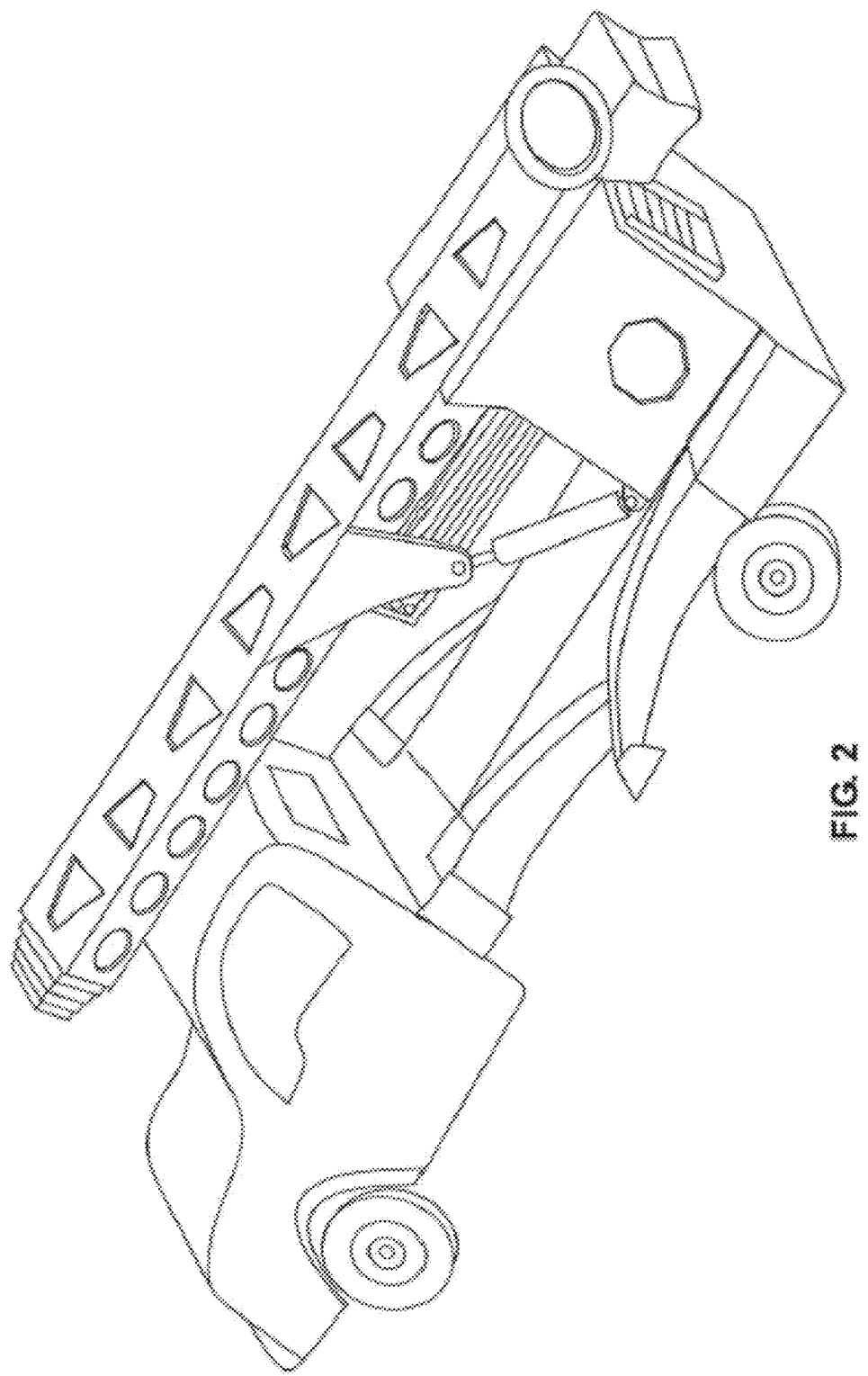
FIG. 2 illustrates an additional perspective view of a preferred embodiment of a completed conveyor truck of the invention.

FIGS. 1 and 2 illustrate a portside plan view of one preferred example of the inventive pickup truck mounted telescoping conveyor system and method, and a portside perspective view, respectively. As shown in FIGS. 1 and 2, a consumer "off the lot" rolling truck chassis, shown generally as 2, is advantageously employed in the truck mounted conveyor method and system, with a structural frame and components mounted on the undercarriage and frame, or rolling chassis. As described in detail in as pending application U.S. Ser. No. 15/599,104, the pickup truck chassis is of a size, including weight, length and height dimensions such that a commercial operator's license is not required to drive the truck mounted telescoping conveyor system apparatus to contemplated sites of activity, nor are any special federal, state and/or local permitting or DOT requirements in need of compliance.

Some non-limiting examples of preferred pickup truck chassis useable herein for conversion to the conveying units of this invention include, for instance, the Ford® F-550® Super Duty Model and preferably with dual rear wheels, although such may not be always necessary depending upon tire models employed. A diesel engine is preferred for job site extended run times while conveying construction materials. Other examples of preferred pickup truck models chassis for conversion include the Dodge 5500 HD, again preferably equipped with dual rear wheels and a diesel power plant. In other words, ideally any class 4 diesel consumer pickup truck is preferred for use herein as based upon the gross vehicle weight rating (GVWR) for conversion to the conveying units of the invention or trucks classified by the DOT's Federal Highway Administration (FHWA) which groups Classes 1-3 as light duty, 4-6 as medium duty, and 7-8 as heavy duty. It is also noted that the United States Environmental Protection Agency has a separate system of emissions classifications for trucks. For general background information the United States Census Bureau in the past has also assigned truck classifications in its now discontinued Vehicle Inventory and Use Survey (VIUS) (formerly Truck Inventory and Use Survey, or TIUS).

Also contemplated for use herein is any cab over design not exceeding any weight, height, and/or length proportions or specifications of any kind requiring specialized licensing operation and/or operation permitting.

Generally, Class 4 consumer trucks preferred for use herein are from about 14,000 to about 16,000 lbs., and include currently available models as mentioned above, such as the Dodge Ram 4500, Ford F-450, and also, for example, GMC 4500 and Ford E-450, and equivalent foreign versions as designated under Foreign classifications, such as Canada and the European Union Class C1 GVWR limit of 7,500 kg, or somewhat in excess of 16,000 lbs. Also contemplated depending upon certain applications and capacity are Class 3 consumer trucks of GVWR of from about 10,000 to about 14,000 lbs., of which the Dodge Ram 3500, GMC Sierra 3500, Ford F-350, Ford E-350, and Hummer H1 are non-limiting examples. In yet still additional examples, in some contemplated applications Class 5 consumer trucks of GVWR of from about 16,000 to about 19,500 lbs. may be suitable, examples of which include the Dodge Ram 5500, GMC 5500, Ford F-550®, and International Terra Star, and also in some preferred embodiments Class 6 medium duty trucks of GVWR of from 19,501 lbs to 26,000 lbs, examples of which include Chevrolet Kodiak® C6500®, Ford® F-650®. Peterbuilt 330® and International Durastar®.

As a further example, a typical class 5 F-550® consumer truck of 19,500-23,000 gvw preferably suitable for use herein may have the following general specifications:
Ford F550®
Power Specifications:

| | |
|---|---|
| Fuel Capacity | 68 gallons (DRW - dual diesel tanks) |
| Drive Type | 4x2 |
| Available Engines | 6.7 L Power Stroke ® V8 Turbo Diesel (standard on Lariat F-450/F-550; optional on all other models) |
| Horsepower | 330 @ 2,600 rpm (6.7 L Power Stroke ® Turbo Diesel) |
| Torque | 750 @ 2,000 rpm (6.7 L Power Stroke ® Turbo Diesel) |
| Transmission | TorqShift ® 6-Speed SelectShift ® Automatic |

-continued

| | |
|---|---|
| Wheelbase | Regular Cab: 145.3" (60" CA); 169.3" (84" CA); 193.3" (108" CA); 205.3" (120" CA) SuperCab: 167.9" (60" CA); 191.9" (84" CA) Crew Cab: 179.8" (60" CA); 203.8" (84" CA) |
| Maximum Payload | 12,730 lbs. (F-550 DRW 4 × 2) |
| Maximum GVWR | 19,500 lbs. (F-550 DRW 4 × 2, 4 × 4) |
| Maximum GCWR | 40,000 lbs. (F-550 DRW 4 × 2, 4 × 4) |

Exterior Dimensions:

| | Regular Cab | | | | SuperCab | | Crew Cab | |
|---|---|---|---|---|---|---|---|---|
| | 60" CA 4 × 2/4 × 4 | 84" CA 4 × 2/4 × 4 | 108" CA 4 × 2/4 × 4 | 120" CA 4 × 2/4 × 4 | 60" CA 4 × 2/4 × 4 | 84" CA 4 × 2/4 × 4 | 60" CA 4 × 2/4 × 4 | 84" CA 4 × 2/4 × 4 |
| Wheelbase | 145.3" | 169.3" | 193.3" | 205.3" | 167.9" | 191.9" | 179.8" | 203.8" |
| Length - overall | 230.7" | 254.8" | 278.8" | 290.7" | 253.3" | 277.4" | 265.2" | 289.2" |
| Height - F-550 DRW (w/o options) | 81.7"/81.5" | 81.7"/81.5" | 81.7"/81.6" | 81.5"/81.5" | 82.0"/81.8" | 81.8"/81.8" | 81.9"/81.8" | 81.9"/81.7" |
| Track - front - F-550 DRW | 74.8" | 74.8" | 74.8" | 74.8" | 74.8" | 74.8" | 74.8" | 74.8" |
| Track - rear - F-550 DRW | 74.0" | 74.0" | 74.0" | 74.0" | 74.0" | 74.0" | 74.0" | 74.0" |
| Rear axle clearance - F-550 DRW | 8.2"/8.2" | 8.3"/8.3" | 8.3"/8.3" | 8.3"/8.3" | 8.3"/8.3" | 8.2"/8.2" | 8.2"/8.2" | 8.2"/8.2" |
| Overhang - front | 38.3" | 38.3" | 38.3" | 38.3" | 38.3" | 38.3" | 38.3" | 38.3" |
| Frame Rail Width - F-550 DRW | 34.2" | 34.2" | 34.2" | 34.2" | 34.2" | 34.2" | 34.2" | 34.2" |
| Rear Axle to End of Frame | 47.2"* | 47.2"** | 47.2" | 47.2" | 47.2" | 47.2" | 47.2" | 47.2" |
| Base Curb 6.8 L Weight - F550 DRW | 6,568 | 6,676 | 6,828 | 6,922 | 6,847 | 7,063 | 7,052 | 7,138 |
| Base Curb 6.7 L Weight - F550 DRW | 7,328 | 7,480 | 7,665 | 7,766 | 7,647 | 7,857 | 7,872 | 7,965 |
| Base Curb 6.8 L Weight - F550+ DRW | 6,693 | 6,769 | 6,932 | 6,998 | 6,956 | 7,108 | 7,127 | 7,277 |
| Base Curb 6.7 L Weight - F550+ DRW | 7,493 | 7,593 | 7,748 | 7,791 | 7,813 | 7,914 | 8,030 | 8,099 |

*89.4" with optional Aft-Axle frame extension (F-450, F-550)

**79.6" with optional Aft-Axle frame extension (F550)

Engine Specifications

| | |
|---|---|
| Configuration | 6.7 L POWER STROKE ® V8 TURBO DIESEL OHV (32-valve) |
| Fuel injection | High-Pressure Common-Rail |
| Engine control system | Electronic |
| Induction system | Single-sequential Turbocharger; charged air cooler |
| Battery | Dual 12-volt; 750-cca/78-amp-hr |
| Alternator | 220-amp (XL, XLT) |
| | Dual combined 332-amp (LARIAT) |
| | Dual combined 357-amp (optional) |
| Cooling system | Pressurized series flow |
| Oil life monitor | Intelligent Oil Life Monitor ® |
| Cylinders | 8 |
| Cylinder head | Aluminum |
| Block material | Compacted graphite iron |
| Valve operation | Push rod/rocker arms |
| Camshaft drive | Gear |
| Bore | 3.90" |
| Stroke | 4.25" |
| Compression ratio | 16.2:1 |
| Horsepower/rpm | 330 @ 2,600 |
| Torque lb.-ft/rpm | 750 @ 2,000 |

Transmission Specification

| | | |
|---|---|---|
| Transmission Type | TorqShift ® 6-speed automatic with SelectShift ® (6.7 L diesel) | |
| Case material | Aluminum | |
| Power Takeoff | Live-drive access on driver side | |
| Gear ratios | $1^{st}$ | 3.91:1 |
| | 2nd | 2.31:1 |
| | $3^{rd}$ | 1.51:1 |
| | $4^{th}$ | 1.14:1 |
| | $5^{th}$ | 0.85:1 |
| | $6^{th}$ | 0.67:1 |
| | Reverse | 3.12:1 |

Chassis Specifications
Front Suspension

| | |
|---|---|
| Type | Solid Twin-Coil Monobeam axle (F-350 4 × 4, F-450/F-550) |
| Max. Front GAWR | 7,500 lbs. (F-550 4 × 2) |
| | 7,500 lbs. (F-550 4 × 4) |
| Spring | Coil |
| Shock absorbers | Gas type |
| Stabilizer bar | Standard |

Rear Suspension

| | |
|---|---|
| Type | Solid axle |
| | Solid Twin-Coil Monobeam axle (F-350 4 × 4, F-450/F-550) |
| Max. Front GAWR | 14,706 lbs. (F-550 4 × 2) |
| | 14,706 lbs. (F-550 4 × 4) |
| Spring | Leaf |
| Shock absorbers | Gas type |
| Stabilizer bar | Standard |

Steering

| Assist | Power Hydraulic |
|---|---|

Brakes

| | |
|---|---|
| Type | 4-wheel vented-disc ABS (standard) |
| Front (rotor diameter) | 15.39" (391 mm) (F-450/F-550) |
| Rear (rotor diameter) | 15.75" (400 mm) (F-450/F-550) |

Wheels

| | |
|---|---|
| Type | Steel or aluminum |
| Size | 17" SRW/DRW, 18" SRW (F-350); 19.5" (F-450/F-550) |
| Number of studs | 8 (F-350); 10 (F-450/F-550) |
| Bolt-circle diameter | 8.86" (F-450/F-550) |

Conventional Towing—Maximum Loaded Trailer Weight Ratings (Lbs.)

| | Regular Cab | |
|---|---|---|
| | F-550 4 × 2 | F-550 4× 4 |
| Engine with Automatic Transmission | 18,500 | 18,500 |
| 6.7 L Power Stroke ® Turbo Diesel V8 | 18,500 18,500 | 18,500 18,500 |

Payload Package Selector

| | | Regular Cab | | | SuperCab | | | Crew Cab | |
|---|---|---|---|---|---|---|---|---|---|
| | MAX GVWR (LBS) | 45.0" WB 60" CA | 45.0" WB 60" CA | 45.0" WB 60" CA | 45.0" WB 60" CA | 167.5" WB 60" CA | 167.5" WB 60" CA | 179.4" WB 60" CA | 179.4" WB 60" CA |
| F-550 DRW 4 × 2 | 17,500 18,000 19,500 | 10,930 11,430 12,000 | 10,820 11,320 12,730 | 10,670 11,170 12,560 | 10,570 11,070 12,500 | 10,650 11,150 12,540 | 10,430 10,930 12,390 | 10,440 10,940 12,370 | 10,360 10,860 12,220 |
| F-550 DRW 4 × 4 | 17,500 18,000 19,000 19,500 | 10,610 11,110 11,960 11,670 | 10,480 10,980 — 12,370 | 10,310 10,810 — 12,240 | 10,250 10,750 — 12,120 | 10,300 10,800 — 12,160 | 10,130 10,690 — 12,070 | 10,080 10,580 — 11,930 | 10,010 10,510 — 11,900 |

The truck conversion unit (i.e. pickup truck) serving as the basis of the powered structural frame pickup truck chassis in accordance with the invention can easily be obtained from any conventional dealership, and where such can be easily serviced or by any other vehicle servicing entity. A preferred example of a conversion in accordance with the invention as mentioned is shown in FIG. 1, with some preferred dimensions, and preferred component set ups discussed in more detail below. As generally shown in FIG. 1 there is a plan side schematic view of the port side a typically converted diesel engine controlled split shaft power take-off ("PTO") hydraulic mobile unit which can be operated with an ordinary driver's license and needs no special permitting of any kind to travel over any type of roads to a contemplated job site, be it a multilevel building, foundation, or a backyard pool, etc. In this preferred example in FIG. 1, the truck is modified by stripping all non-essential components extending from the back of the cab compartment leaving the transmission housing, engine and components and rolling chassis with wheels and outer frame rails shown generally as 2. To the extent possible all modified components installed including mounting brackets, reservoir components, such as hydraulic fluid and water reservoir compartments, pipe and hose containment compartments and the like, except, for example, hydraulic pump cylinders and the like, are of aluminum or composite construction to reduce weight. Thus, as shown in FIG. 1 there is shown generally a mobile conveying apparatus mounted on the undercarriage bed frame of a pickup truck chassis 4, fitted with a hydraulic fluids tank (not shown in this FIG. 1), water tank 14 (not shown in FIG. 1), and conveyor apparatus components and assemblies, shown generally as 6, as discussed above, above a drive shaft apparatus (drive shafts and differentials discussed below) and real axel gear hub, with electronic control capability (all not shown in this FIG.). In this particular preferred embodiment the truck modified to mobile conveying apparatus in accordance with the invention is approximately 27' long from front truck bumper to end. This F-550 base model has a wheelbase of 205" and employs dual back wheels. The suspension may employ a steel lift kit, while otherwise remaining stock. A split dual driveshaft set up with a distribution gearbox transfer case assembly operably situated therebetween is exemplified in this preferred example, preferably employing a gearbox comprising a yolk valve such as a distribution gearbox, which is installed as operably coupled to the dual drive shafts as further explained below. This preferred example mobile conveying system is unique in employing two drive shafts in operable connection with a distribution gearbox. This preferred example is of approximately 19,500 lbs. total weight, with weights of up to 23,000 lbs GVWR contemplated.

Figure 3:
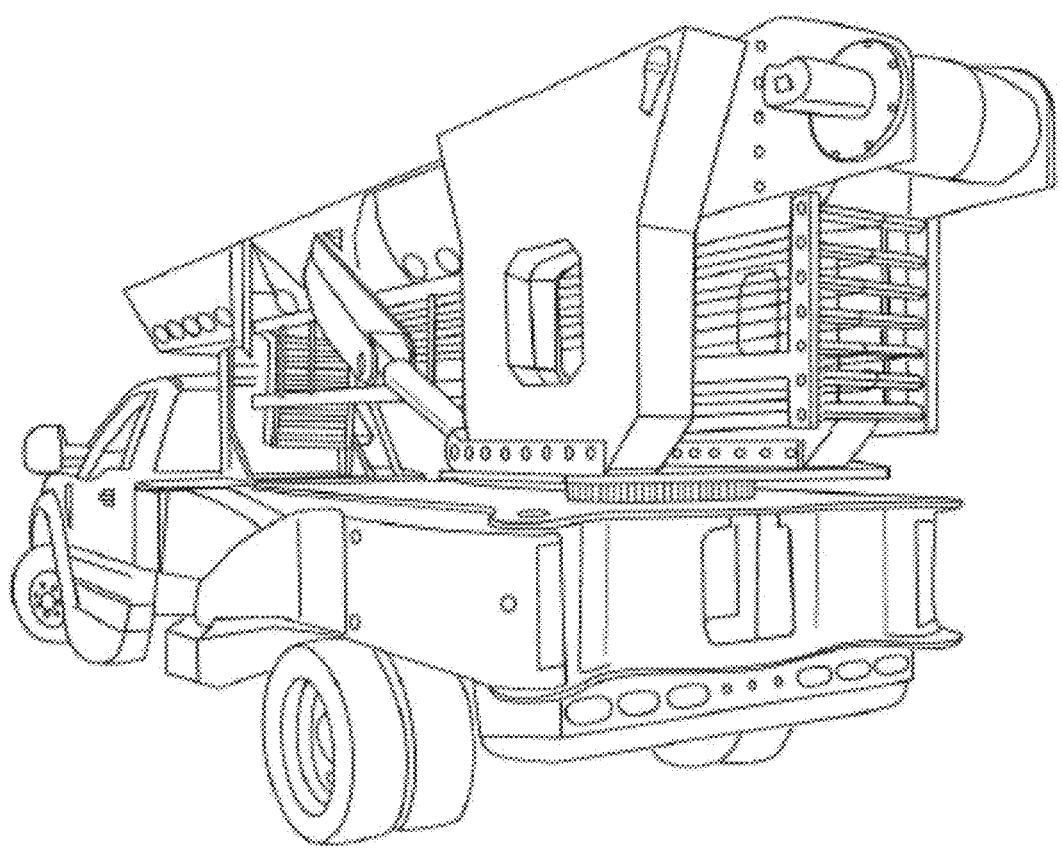
FIG. 3 illustrates yet another perspective view of a preferred embodiment of a completed conveyor truck conversion.
Figure 4:
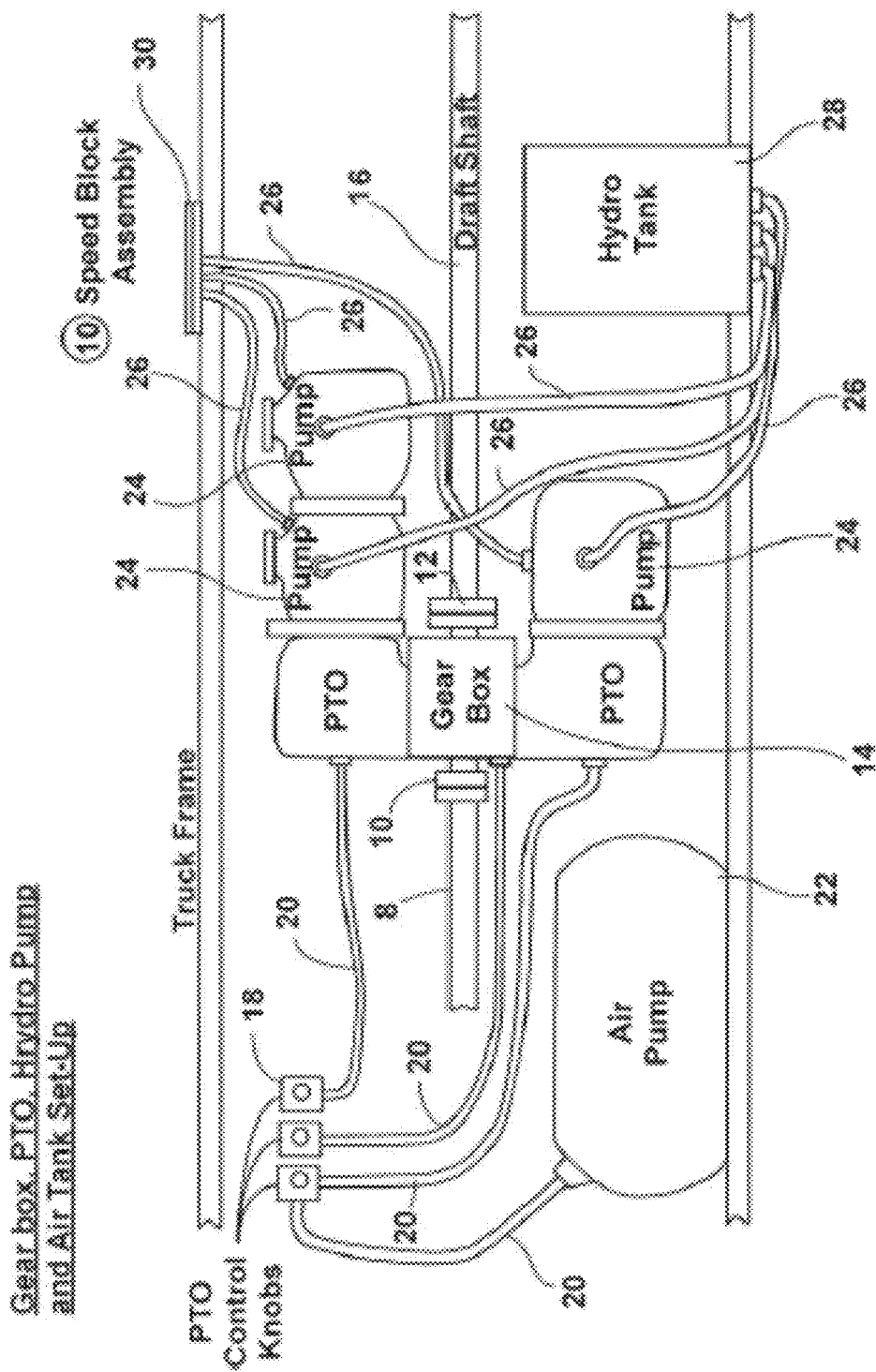
FIG. 4 illustrates a preferred embodiment of some components of the invention.

Shown in FIG. 3 is another perspective rear view of a preferred embodiment completed truck conversion. The PTO drive via first and second drive shaft apparatus is essentially the same as that described in U.S. Ser. No. 15/599,104. Referring to FIG. 4, the rolling chassis generally shown as 4 complete with dual rear wheels conversion is fitted with a first drive shaft 8 with universal joints 10 and 12 connected to distribution gearbox/transfer case, shown generally as 14, which is supplied with airlines operably connected to a compressed air unit (not shown), with air lines (not shown), preferably ¼", and operated by an air valve switch (such as situated in the vehicle cab and not shown) to control a yoke valve (not shown) which engages and disengages the gearbox 14 with first drive shaft 8 on demand, or in other words performs a PTO driven function.

When not engaged (or disengaged), the gearbox 14 is coupled by way of a second universal joint 12 to a second drive shaft 16 which drivably operates the F550 vehicle rolling chassis 2 for movement of the pumping system to a work site. It is also contemplated that yoke valve be operable by an electronic switch. Also shown in FIG. 4 are PTO controls 18 as connected by air lines 20 and air tank 22, operating PTO functions and gearbox 14.

As further shown in FIG. 4, various pumps 24 in operable connection via hydraulic pumping lines 26 as connected to hydraulic reservoir 28 are used to operate other components of the assembled conveying apparatus, such as spool block assembly 30 which operates the serpentine assembly as more fully discussed below. All of the above mentioned components are situated at the truck frame 4 portions of the rolling chassis 2 to provide a low center of gravity, and low in height in an assembled unit for compactness and greatly reduced weight.

Figure 5:
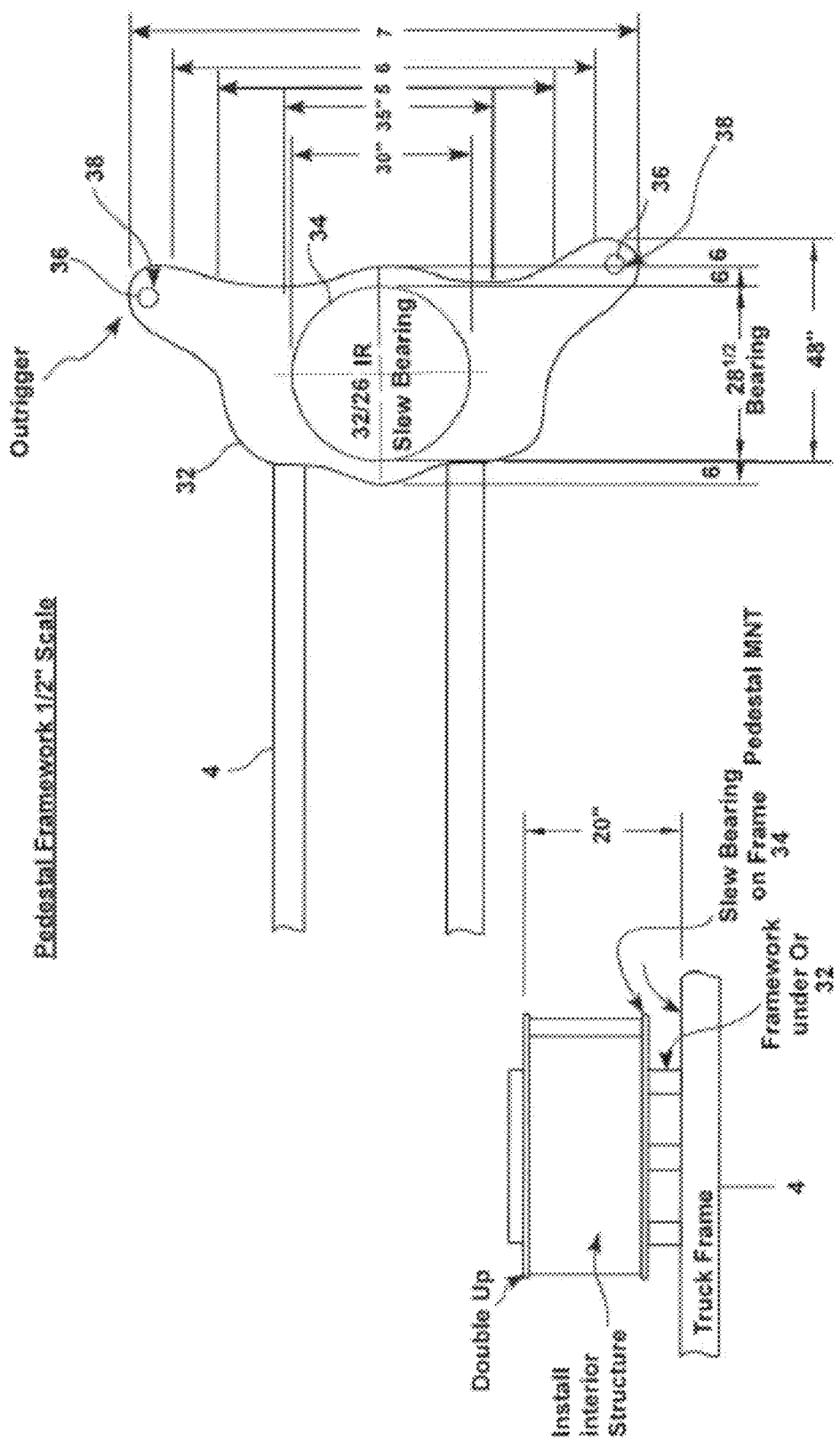
FIG. 5 illustrates a preferred embodiment of some components of the invention.

Referring to FIG. 5 is shown in detail the back pedestal mount plate 32 attached to the truck main frame 4 via turntable-slewing bearing assembly 34. Attachment locations for rear port and starbord outrigger arms are shown as 36.

Figure 6:
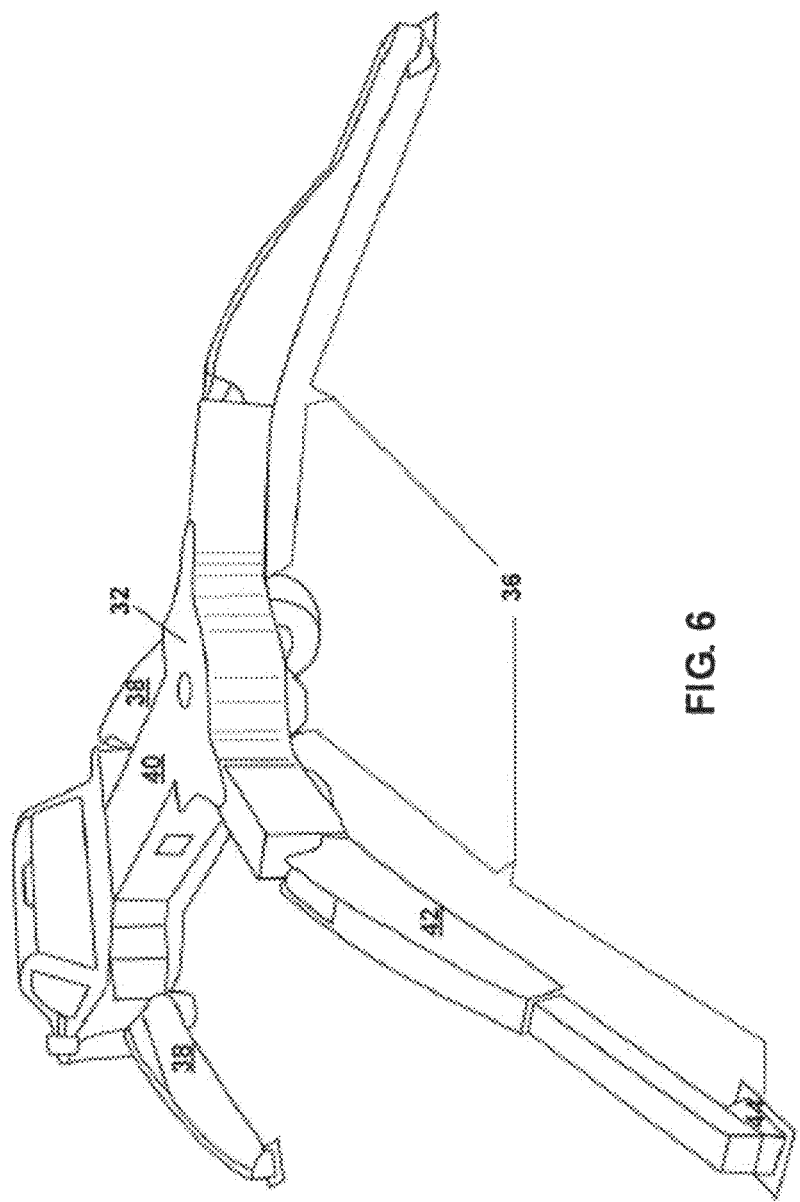
FIG. 6 illustrates a preferred embodiment of some components of the invention.

FIG. 6 illustrates truck chassis 2 with components on frame 4 inclusive of pedestal mount plate 32 with both port and starbord rear outrigger arms 36 and port and starbord front outrigger arms 38 attached to frame 4 lineal middle section 40. In this embodiment front outriggers 38 are preferably 7 feet in length and rear outriggers are 10 feet in length with 3-foot telescoping extensions, both front and rear outriggers 36 and 38 being fitted with swivel pad mounts 44.

Referring to FIGS. 5 and 6, the pedestal mount 32 fitted with slewing bearing/table 34 will preferably allow for the horizontal pedestal framework to turn in a 360° radius, and which is mounted in between the main pedestal mount 32 and framework for the telescoping triangular extensions, described in more detail below.

Figure 7:
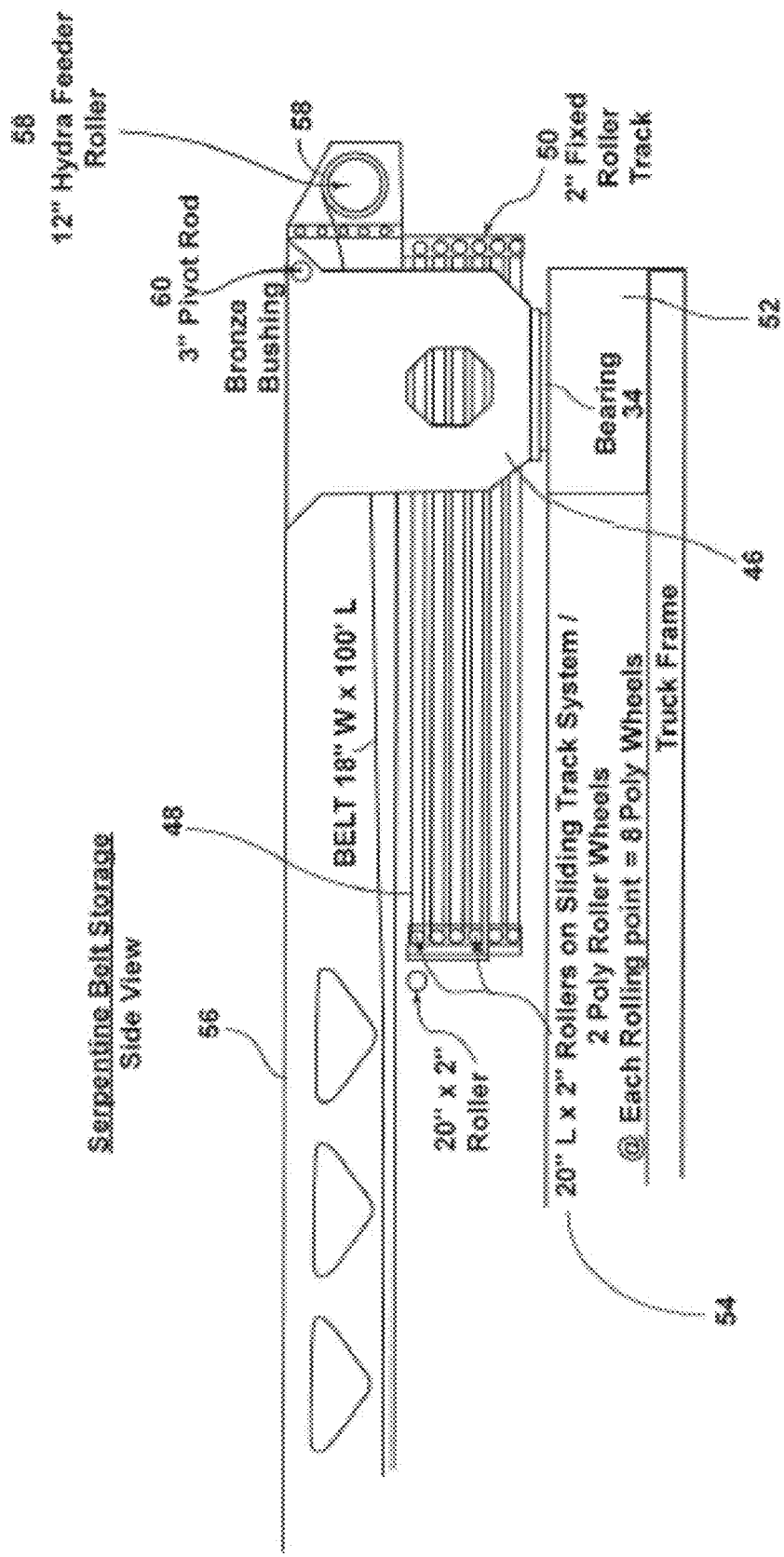
FIG. 7 illustrates a preferred embodiment of some components of the invention.

FIG. 7 shows a port side plan view of truck frame 4 fitted with pedestal mount 32 and slewing bearing table 34 to which is attached rotatable (via slewing bearing table 34) framework 46 for mounting movable serpentine belt storage, shown generally as 48. As indicated FIG. 7, serpentine belt 48, shown here as preferably 18" in width by 100' in length, is wound and stored in rollers 50, preferably 6-7 fixed rollers on a fixed 2" roller track 51 at the rear, and a sliding roller track 54 at the front portion of serpentine belt system 48 which also preferably comprises 6-7 fixed rollers 55. Sliding track 54 may move back and forth horizontally by way of a wheel arrangement (not shown), preferably comprising, 4 or so wheels to extend or compact the serpentine belt 48 system for storage on rollers 50. The serpentine belt 48 is attached to telescoping triangular sections 56 and stored as desired by way of a hydraulically operable feeder roller 58, which may be 12" in diameter, while telescoping triangular sections 56 are rotatable 360° via slewing bearing table 34. The triangular telescoping sections 56, may also be elevated as desired via hydraulic action via a pivot rod assembly 60. The telescoping triangular sections slide in and out from each other with the aid of polymeric dry glide facing material as described. Within the telescoping triangular sections is the conveyor belt of 15" or 18" width which in a preferred embodiment slides on the polymeric facing material, such as a conveyor belt of rubber/nylon material as mentioned above.

The telescoping triangular sections 56, each smaller in size than the other, of which there are preferably 5 in number in this preferred embodiment, slide into each other starting with the outermost section into the next larger in diameter section and then into the next still larger section and so on via installed polymer dry glide facing material as described, or extend in like manner, all by way of a cable means, such as a 5/16" steel cable, operable by a hydraulic planetary motor, or otherwise to extend or retract the individual telescoping triangular sections by unwinding/winding the cable (all not shown). In other words, the telescoping triangular sections comprise a plurality of sections, nesting in each or extending out from each other when telescoping.

The telescoping sections 56 as shown in triangular configuration, are also contemplated to be in a circular cross-section configuration or oval cross section in shape, or in any geometric cross section shape as desired, and with serpentine conveyor belt 48 situated within telescoping nesting sections 56 also contemplated to be of smaller or wider widths than 18", depending on factors such as end use contemplated.

As will be recognized and appreciated by these skilled in the art, the 360° rotatable and elevatable, telescoping triangular sections for conveying material for placement, such as concrete and gravel, is made very compact by the operating track sliding serpentine belt arrangement. This inventive apparatus enables placement of such conveying equipment having desired capacity of 18" with convenience capacity of a relatively much smaller truck chassis than would otherwise be required and without attendant extension equipment, motors and the like, providing for materials conveyance apparatus much reduced in height and weight from conventional apparatus, and thus providing many advantages as discussed over conventional apparatus.

Figure 8:
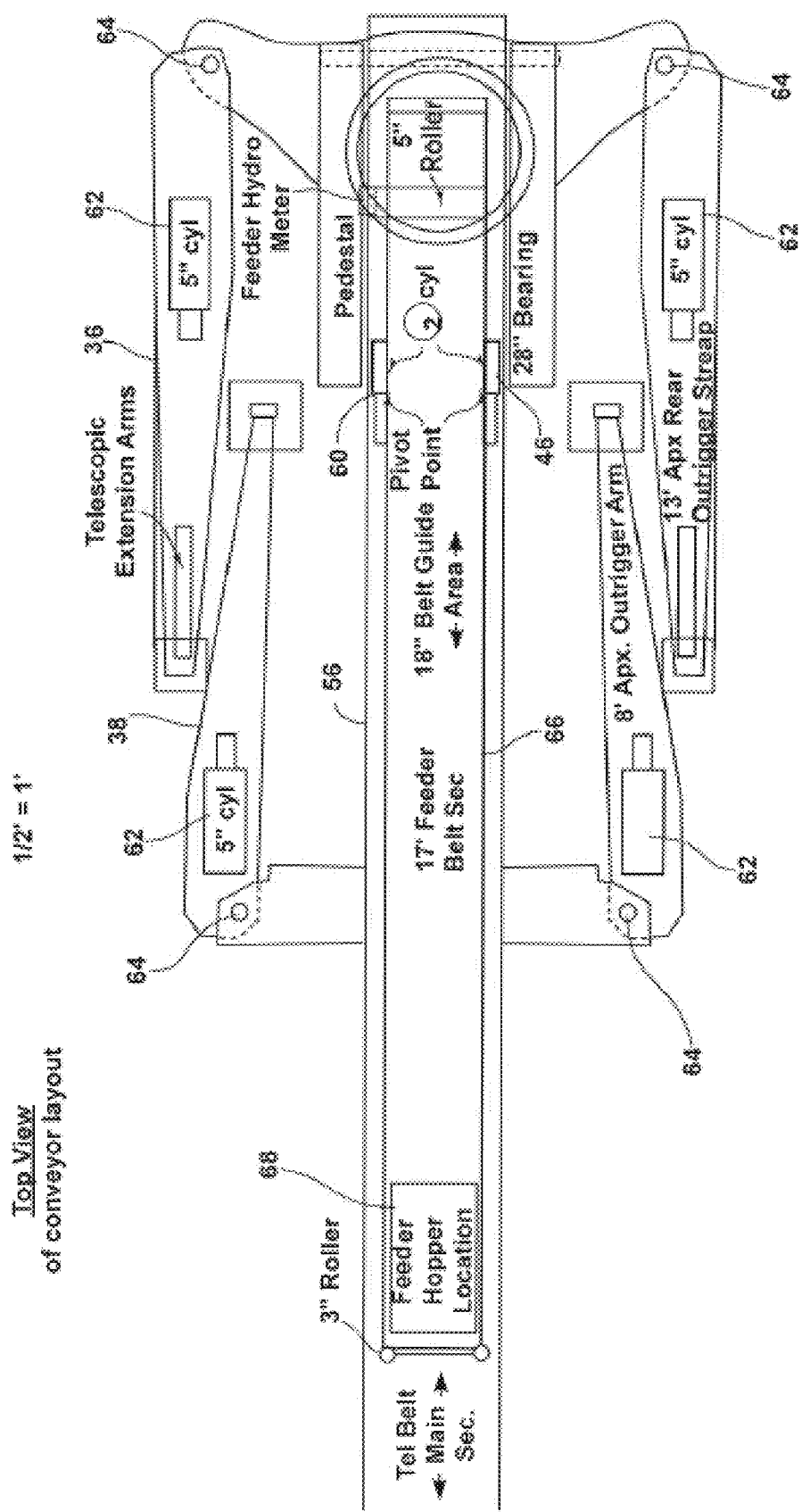
FIG. 8 illustrates a preferred embodiment of some components of the invention.

FIG. 8 shows a top plan view of the installed apparatus which operates the triangular telescoping sections system 56 for materials conveyance. As shown both port and starboard, front and back outrigger, arms 38 and 36 respectively, are in a folded in position for travel of the telescoping conveying apparatus as mounted on frame 4 of rolling chassis 2. The outrigger arms 36 and 38 are foldable or otherwise operably moveably by way of hydraulic cylinder operated means 62. Outrigger arms are attached to frame 4 at pivot points 64. Also shown in this plan view is pedestal 32 with slewing bearing 34 on which is mounted rotatable (via rotatable bearing 34) telescoping triangular sections 56 by way of framework 46, on which telescoping triangular sections 56 pivot on pivot points 60. Also shown is feeder belt section 66 situated inside of telescoping triangular sections 56 for conveying concrete on other desired material to a contemplated site. As described, the belt section delivering material through telescoping triangular sections glides on installed polymeric material. A feeder section 66 receives the material of choice to be conveyed.

Figure 9:
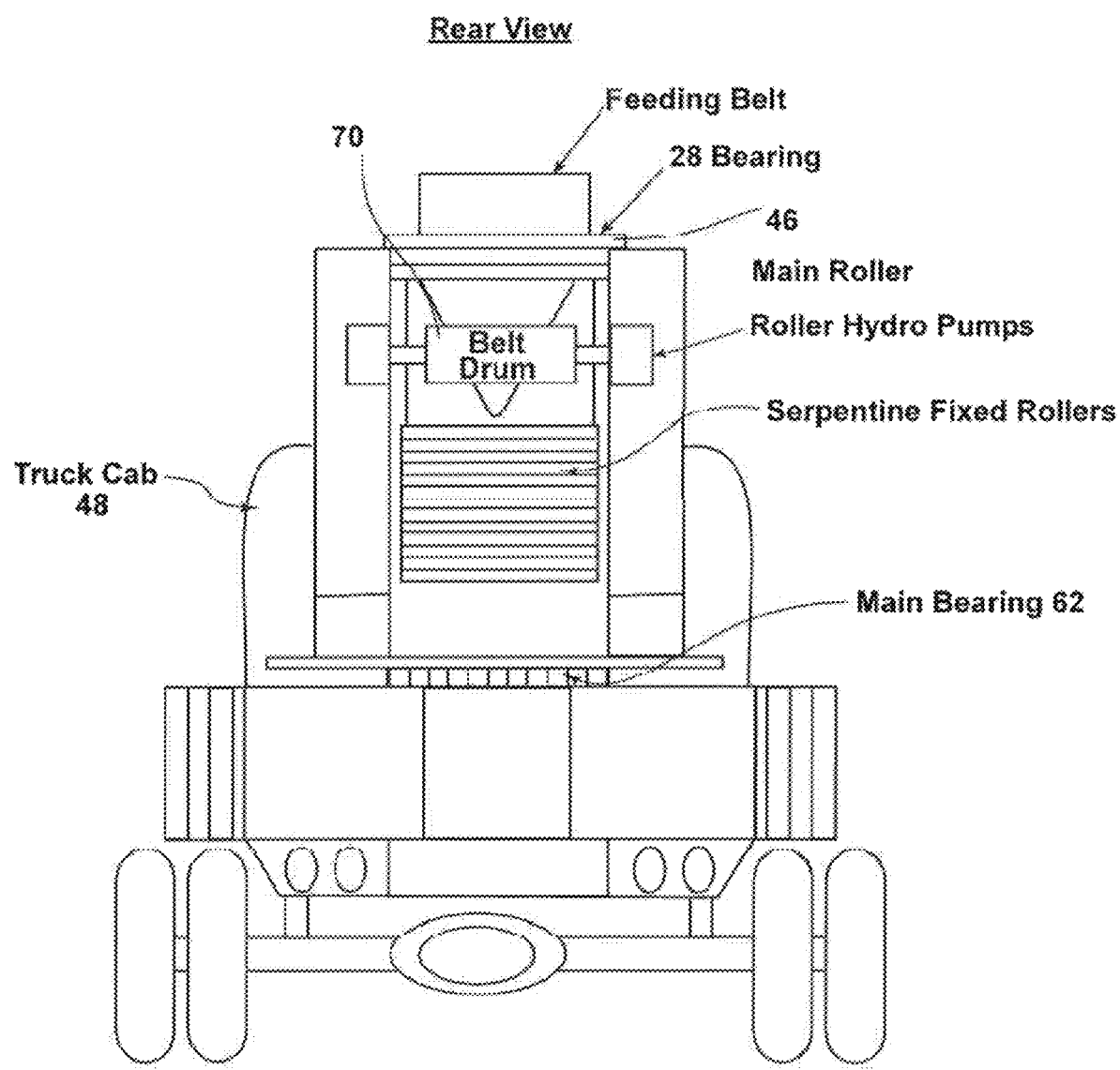
FIG. 9 illustrates a preferred embodiment of some components of the invention.

FIG. 9 shows a rear view of the serpentine belt apparatus/system 48 which winds/unwinds the serpentine belt system 48 by way of a hydraulically operable belt drum 70. The telescoping sections 56, of which there are preferably 5 in number in this preferred embodiment slide out of and within each other in telescoping action by gliding on a polymeric installed surfacing material situated as described above on at least all corners of a triangular telescoping section. The telescoping sections are attached to the rotatable framework 46, preferably, by 3" in diameter bronze bushing pivot pins (not shown here). The main bearing is shown as 62 in this view.

As also described, preferably a 17' telescopic feeder belt attached to a 28" bearing mounted to the main vertical pedestal structure is bolted to the feeder belt, which as described is rotatable 360° with one or more actuator cylinders (not shown) which allow for raising and lowering of the feeder belt to where a hopper 68 may be attached, and which hopper 68 may be removable. The feeder belt is preferably ⅛" thick aluminum in a dual-piece monolithic structure to provide strength and integrity and ease of slide and glide of a rubber/nylon moving belt to receive material (concrete) to be conveyed on the hopper and to the top of the main telescoping section 46 for placement of concrete, gravel or other material is contemplated.

Figure 10:
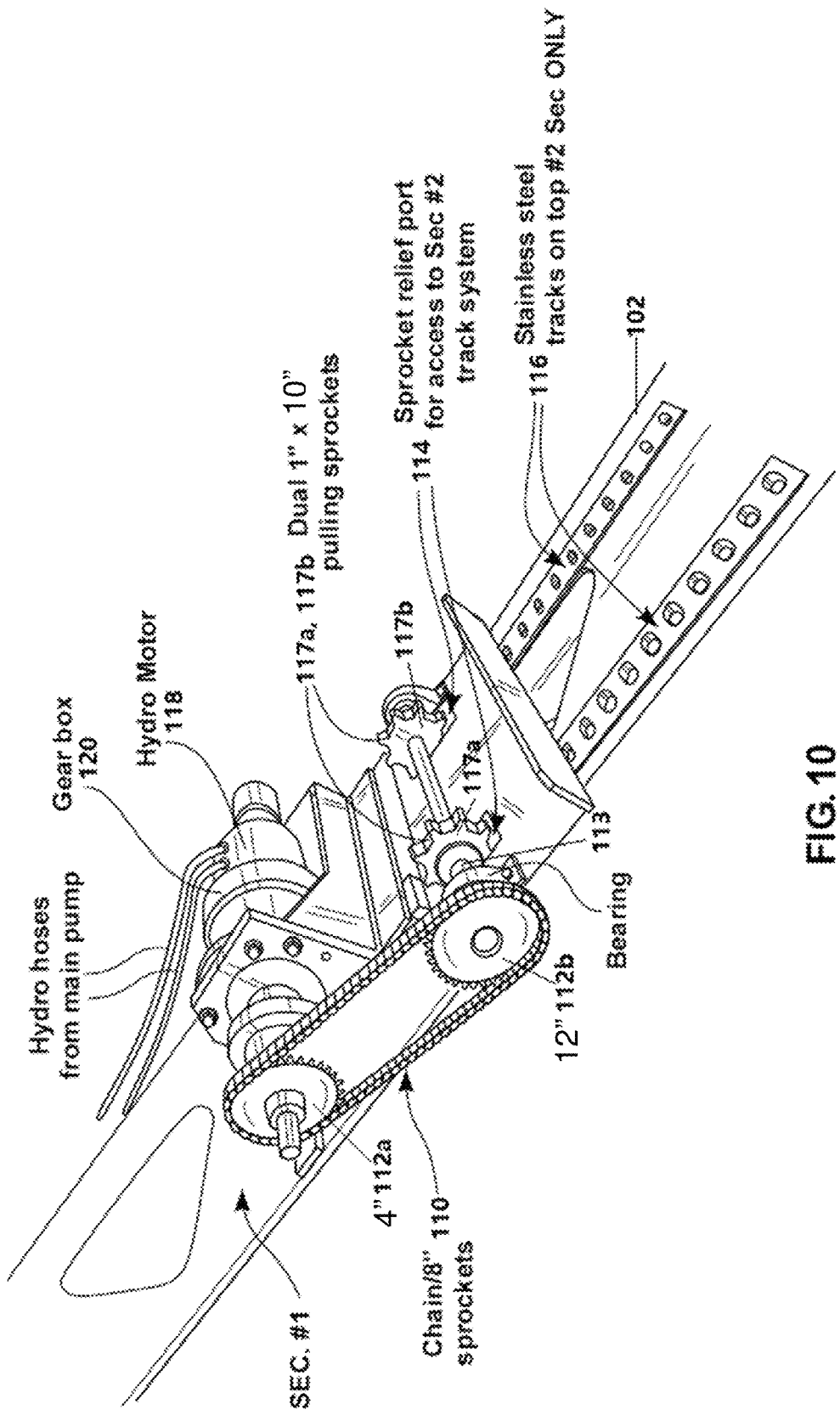
FIG. 10 illustrates a preferred embodiment of tack assembly and transmission assembly of the invention.
Figures 11, 12:
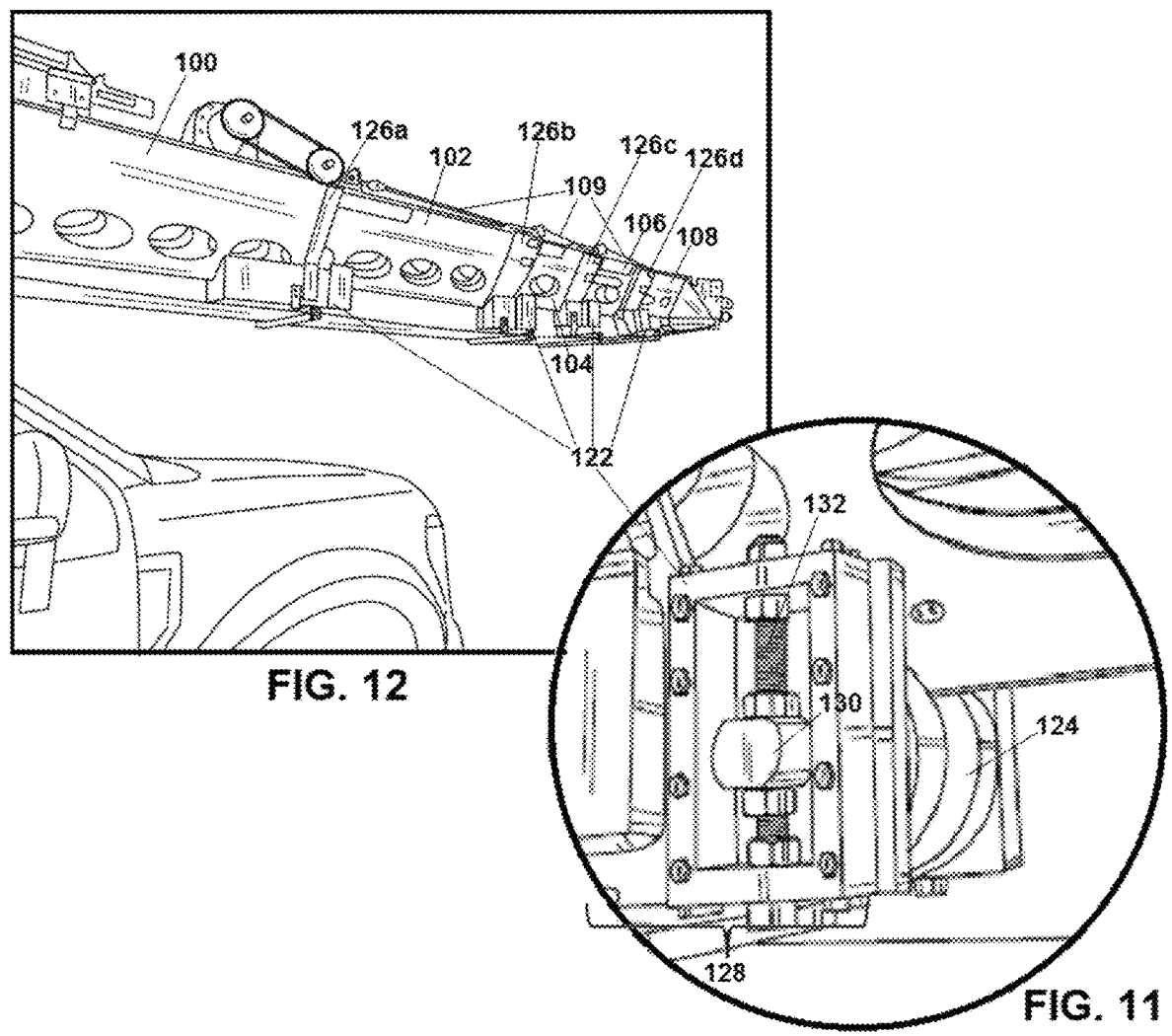
FIG. 11 illustrates an enlarged view of a preferred embodiment of roller assembly of the invention.
FIG. 12 illustrates a preferred embodiment of some components of roller assembly, telescoping sections and nesting ends of the invention.

An additionally preferred embodiment employing a class 5 rolling chassis, e.g. a Ford 550® dual rear wheel diesel pickup truck, with preferred structural/functional features is shown in FIGS. 10-12 and described below.

With the features of the conveyor having been detailed above and as shown in FIG. 1, essentially, the framework 46 is configured for attachment to the rolling chassis 4 and for rotation relative to the rolling chassis 4. The hydraulically operable telescopable conveying unit attached to the framework 46 and having a plurality of telescoping sections 56 nest in or extend out from each other at a nesting end of non-telescoping section 100 and each telescoping section 102-108 when telescoping. Shown here as sections 100-108, section 100 is the only non-telescoping section, but rotatable relative to rolling chassis 4 along with other nesting telescoping sections 102-108. The conveyor apparatus further includes a geared driven system that is configured to cause telescoping sections 102-108 to be axially extended or retracted with each section preferably moving in unison. In this embodiment axial movement of telescoping sections 102-108 at different rates and/or different distances relative to one another is also contemplated for maximum flexibility and adaptability to different work or job sites. A force is applied for telescopic movement of the telescoping sections 102-108 only to the telescoping base section 102. The remaining moving sections 104, 106 and 108 are pulled in or out in unison with equalizer cables 109 which can be of varying proportions as desired. Equalizer cables 109 are preferably maintained to a determined desirable tension by a tensioning system (not shown). Power may be provided by a dedicated motor, by a motor shared with other devices, or through other means.

A motor 118, shown in the embodiment in FIG. 10 as a hydraulically operated motor, is installed at top of the non-telescoping section 100. Preferably the motor 118 is hydraulic and is positioned at tip end of the non-telescoping section 100. The motor 118 drives a track assembly via a transmission assembly for telescoping the base section 102. In this embodiment the transmission assembly of a chain-sprocket system is employed, although alternative motion transmission assembly such as gear chains, wheels-belt, friction wheels, cable and spool or otherwise is contemplated, as desired. The track assembly includes dual geared sprockets 117a, 117b with power transmitted by the motor 118 via the chain-sprocket transmission assembly. The chain-sprocket transmission consists of a sprocket driven chain 110 wrapped around a pair of sprockets 112a, 112b, preferably each sprocket being between approximately 4" to 12" in diameter as shown, depending upon placement application of the sprocket. As shown in FIG. 10, in a preferred embodiment sprocket 112a is approximately 4" in diameter, sprocket 112b is approximately 12" in diameter and sprocket 117a and 117b are approximately 10" in diameter. Sprocket 112a is engaged with shaft 111 of the motor 118 while another sprocket 112b is engaged with axle 113 of the dual geared sprockets 117a, 117b. The motor 118 outputs power to drive the sprocket 112a to rotate and thereby transmit the rotational motion to the sprocket 112b via a chain 110. The rotational motion is then transmitted from the sprocket 112b to the axle 113 and thereby drives the geared sprockets 117a, 117b. The track assembly further includes tracks 116 mounted on the base section 102. The geared sprockets 117a, 117b mounted on a suitable axle 113, such as a bar support, operate through an opening or a relief port 114 by gear teeth, or cogs, interacting with a plurality of complimentary openings on the tracks 116 to advance or retract the telescoping base section 102 as desired and in unison with other telescoping sections 104, 106 and 108. The geared sprockets 117a, 117b are operably rotated to advance or retract by way of the driven chain 110 controlled by the motor 118 with gear box 120, although any suitable motor, electric or otherwise is contemplated. Additionally, while two geared sprockets are shown in this embodiment, one geared sprocket interacting with one complimentary track may be employed as desired, to advance or retract the telescoping base section 102. In this embodiment, sprockets, gears, etc. are preferably fabricated from stainless steel for durability and longevity. Slidable polymer as described herein may also be employed as desired to aid in facilitating movement of the telescoping sections 102-108 relative to one another.

In another preferred design as shown in FIG. 11, a feature of an adjustably mounted roller assembly 122 is introduced to the conveyor. This roller assembly comprises one or more rolling wheels, collectively 124, enclosed by mounting frames, collectively 128, adjustably mounted to the bottom outer edge of the non-telescoping section 100 shown in FIG. 12 and the telescoping sections 102, 104, 106 and 108. Cables 109 extend or retract the respective telescoping sections 102, 104, 106, and 108 from non-telescoping section 100 by way of motor 118, or otherwise planetary motor 118, as discussed herein and as shown in the FIGS. It is to be understood that this is only one preferred embodiment as contemplated, and that many other plausible embodiments are also contemplated for extending and retracting telescoping sections herein, such as, for example, without limitation, that employed as a telescoping boom-ladder or aerial on TeleSqurt® fire truck series by Spartan. Each of the telescoping sections 102, 104, 106, and 108 is preferably mounted with at least one rolling wheel upon which each section rests, preferably at the nesting ends 126a-d of the sections, and which each section may extend or retract by, at least in part, rolling on to facilitate axial movement of the next section, and thereby the roller assembly facilitates sliding of the sections relative to one another as they are extended or retracted. Also as illustrated in FIG. 12 each rolling wheel is mated to a respective mounting frame 128 comprising an adjusting mechanism to allow for vertical adjustment of the wheel to accommodate the movements of the respective section. Preferably, the adjusting mechanism includes a movable shaft 130 shown in FIG. 11 engaged between threaded rod 132 and axle of the rolling wheel in a manner that by having the moveable shaft 130 moved along the threaded rod 132 thereby also moving the rolling wheel 124 to allow for vertical adjustment of the wheel 124. In another embodiment, the adjusting mechanism may be automatically operable by means of a hydraulic actuated pump, or electrically actuated by a solenoid. More than one mounted rolling wheel assembly per telescoping section is also contemplated.

Additionally, in these preferred embodiments the reach of the telescoping sections 102-108 fully extended is approximately 90 feet to approximately 100 feet, with approximately 90 feet the preferred fully extended length of fully extended telescoping sections 102-108. Preferably, the apparatus is capable of moving approximately 150 yards of material per hour.

Also preferred in these embodiments is a fully loaded conveyor pickup truck assembly apparatus of approximately 9,000 lbs to approximately 21,000 lbs, with approximately 21,000 lbs preferred. Thus a preferred embodiment encompasses an approximately 90 feet full extension of the telescoping sections 102-108 with a fully loaded conveyor truck of approximately 21,000 lbs.

In yet additional example embodiment, contemplated applications include Class 6 medium diesel powered trucks of GVWR of from about 19,501 lbs to about 26,000 lbs., examples of which include the Chevrolet Kodiak® C6500®, Ford® F-650®, Peterbilt 330® and International Durastar®. For case of conversion, in this embodiment the class 6 Ford® F-650® is preferred to employ as a rolling chassis. In these embodiments fully extended telescoping sections will reach approximately 130 feet. All other structural/functional features will remain the same except as otherwise configured/sized appropriately with appropriate structural integrity.

As described in other embodiments, a serpentine belt 48 extending or retracting within and with the telescoping sections 102-108 is moveable to deliver construction material from a rear mounted hopper through the telescoping sections to deploy where desired. Many other suitable variants, depending on various uses, are also, of course, contemplated herein.

In addition to the above described embodiments it is contemplated that the extendable telescoping portions/sections 102-108 be provided with an automatic flexible tensioning means for tensioning the serpentine belt means as desired for contemplated performance. The tensioning means may be a cable situated on pulleys to keep the tension preferably between 800 to about 1200 psi, but whatever range proves acceptable is contemplated for use herein. Usually, a 4:1 ratio between the pulleys is preferred.

Figure 13:
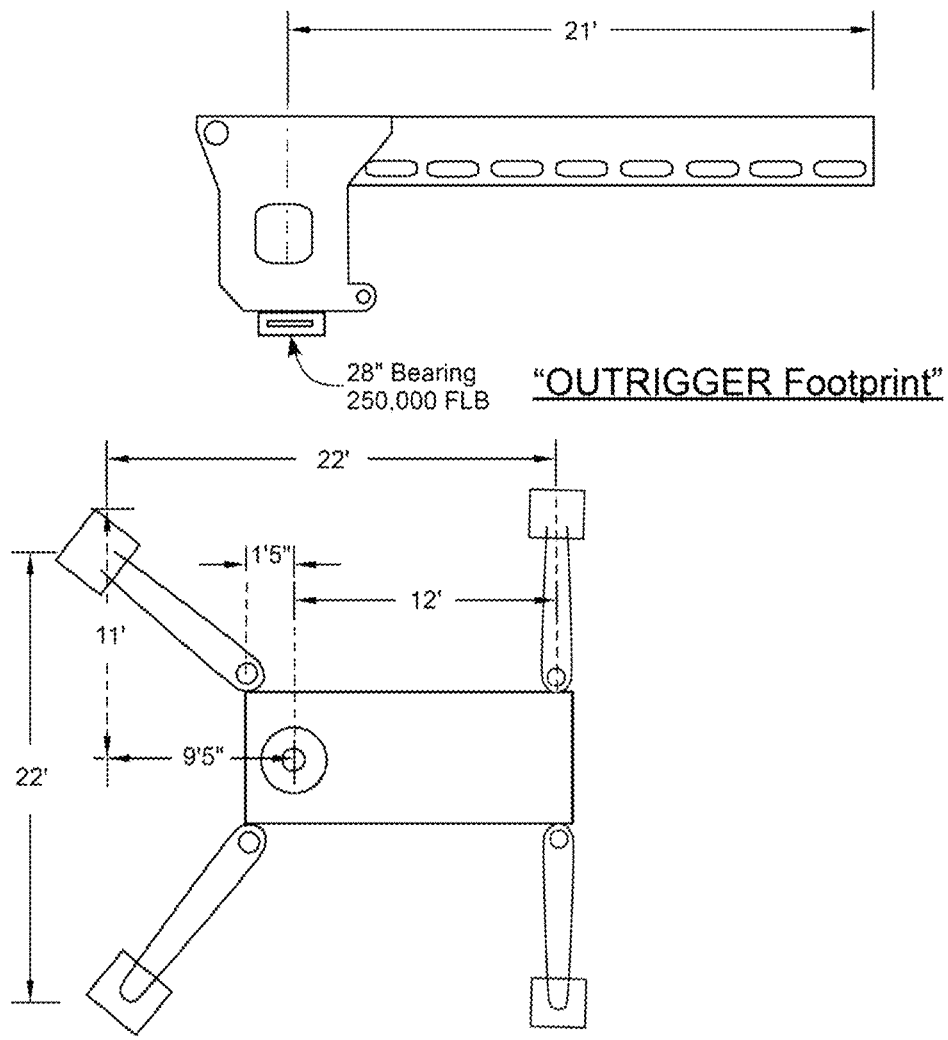
FIG. 13 illustrates a preferred embodiment of additional components of the telescoping sections and outrigger sections of the invention.
Figure 14:
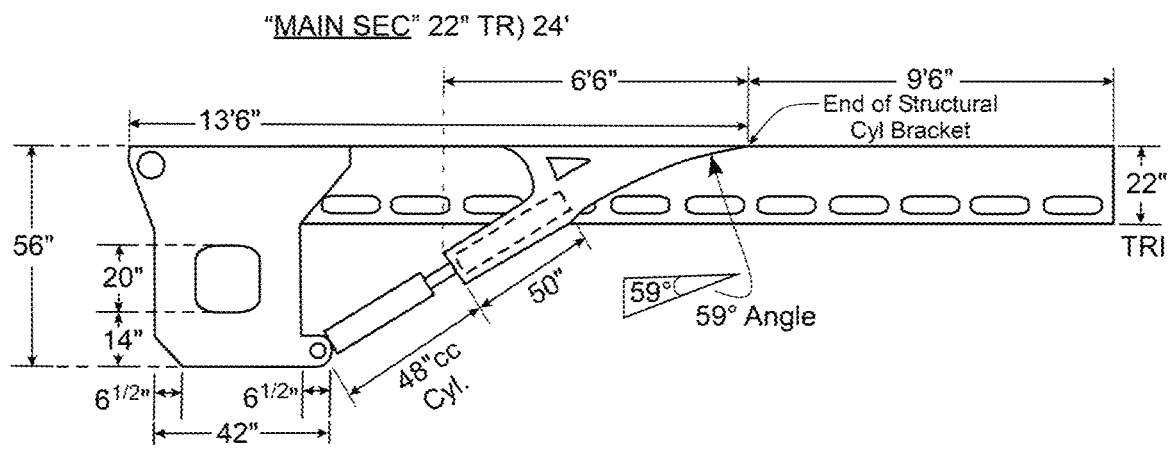
FIG. 14 illustrates yet additional preferred embodiments of components of the telescoping sections of the invention.

FIG. 13 illustrates some preferred measurements of an outrigger footprint as contemplated in some embodiments. FIG. 14 illustrates some preferred measurements of a hydraulically moved main telescoping section as contemplated in some embodiments herein.

This may be envisioned or thought of as a "payload per distance" feature on a telescoping conveying structure. This feature provides advantages for placement of materials of a contemplated capacity at varying distances as contemplated.

Figures 15, 16:
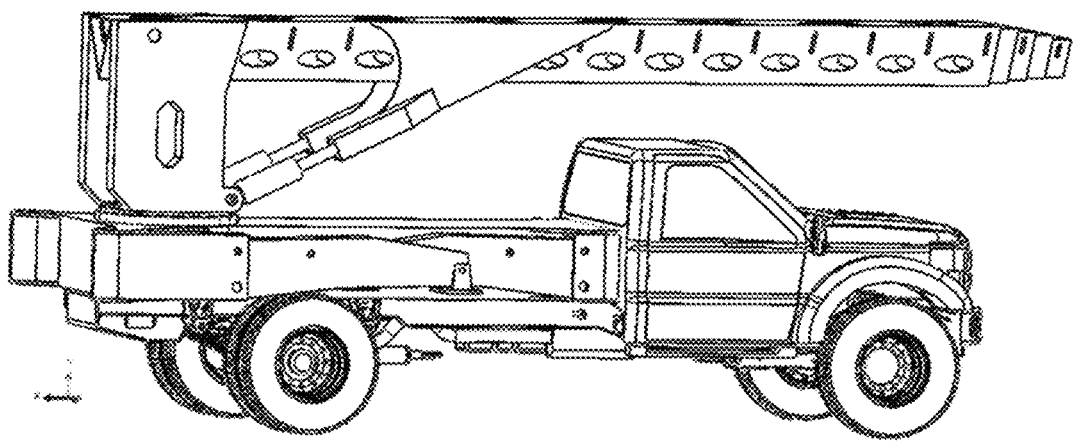
FIG. 15 illustrates still yet additional preferred embodiments of telescoping means of the invention, depicting weight characteristics of telescopic sections, conveyor belt, liner and cable, as calculated in FIG. 17.
FIG. 16 illustrates in perspective view of an additional preferred embodiment of the telescoping conveyor means as adapted to a pickup truck rolling chassis.

In yet an additional embodiment or aspect of the invention as shown in FIG. 15, weight per telescoping section as contemplated may, without limitation, be calculated with the aid of the force diagram depicted in FIG. 17 and the formula shown below:

Fully Retracted $$F_H = \frac{(F_B\cos(\theta) \times 12 + F_L\cos(\theta) \times 24)}{(13.5\sin(90 - \theta - \alpha) + \cos(90 - \theta - \alpha))}$$

Angle and Extension Length Variable $$F_H = \frac{(F_B\cos(\theta) \times d_{BCM} + F_L\cos(\theta) \times d_L)}{(d_{SP}\sin(90 - \theta - \alpha) + \cos(90 - \theta - \alpha))} \quad \begin{array}{l} \Sigma_\tau = \theta \\ \Sigma d_L = 24 \ldots 85 \end{array}$$

| Legend and Definitions for Variables | |
|---|---|
| $\Delta$ = | Change in Value (Increasing/Decreasing) |
| DoF ($\theta$) = | Degrees of Freedom/Angle of Incline/Decline where 0° is Horizontal |
| $d_L$ (ft) = | Distance of Length of Truss Boom [Changes with Extension/Retraction] |
| $d_{BCM}$ (ft) = | Distance of the Boom Center of Mass [Changes with Extension/Retraction] |
| $F_B$ (kN) = | Force (Mass · Gravity (~9.80665 m/s$^2$) at $d_{BCM}$ [Changes with $\Delta\theta/\Delta d_L$] |
| $F_L$ (kN) = | Force at $d_L$ [Changes with $\Delta\theta$] |
| $F_H$ (kN) = | Force at Hydraulic Cylinders [Changes with $\Delta\theta/\Delta d_L/\Delta d_{BCM}/\Delta F_B/\Delta F_L/\Delta F_H$] |

1 kN = 224.81 lbs Lbs to kN Conversion Factor
$F_B$(kN) = (996 + 657 + 484.5 + 343.5 + 225 + ($D_L$ * 2.5)/224.81)/2
$F_L$(kN) = (996 + 657 + 484.5 + 343.5 + 225 + ($D_L$ * 2.5)/224.81)/2
Initial Condition - Conveyor Under Zero Load with Equal Weight Distribution ($D_L$ * 2.5)
Weight of Belt, Polymer Sheath, and Cable = 2.5 lbs/ft [(996 + 657 + 484.5 + 343.5 + 225 + ($D_L$ * 2.5)/224.81)/2]
Weight of Truss Sections + ($D_L$ × 2.5) ÷ 2 (Equal Weight Distribution Across)

As shown in FIG. 15, in a five-section contemplated conveyor model, preferred section measurements with respective weights are depicted, along with belt weight, liner and cable weight all showing the extremely light weight of the invention while maintaining competitive placement capacity not heretofore possible.

FIG. 16 shows an additional perspective view of a conveyor apparatus embodiment of the invention with nested telescoping sections.

Figure 17:
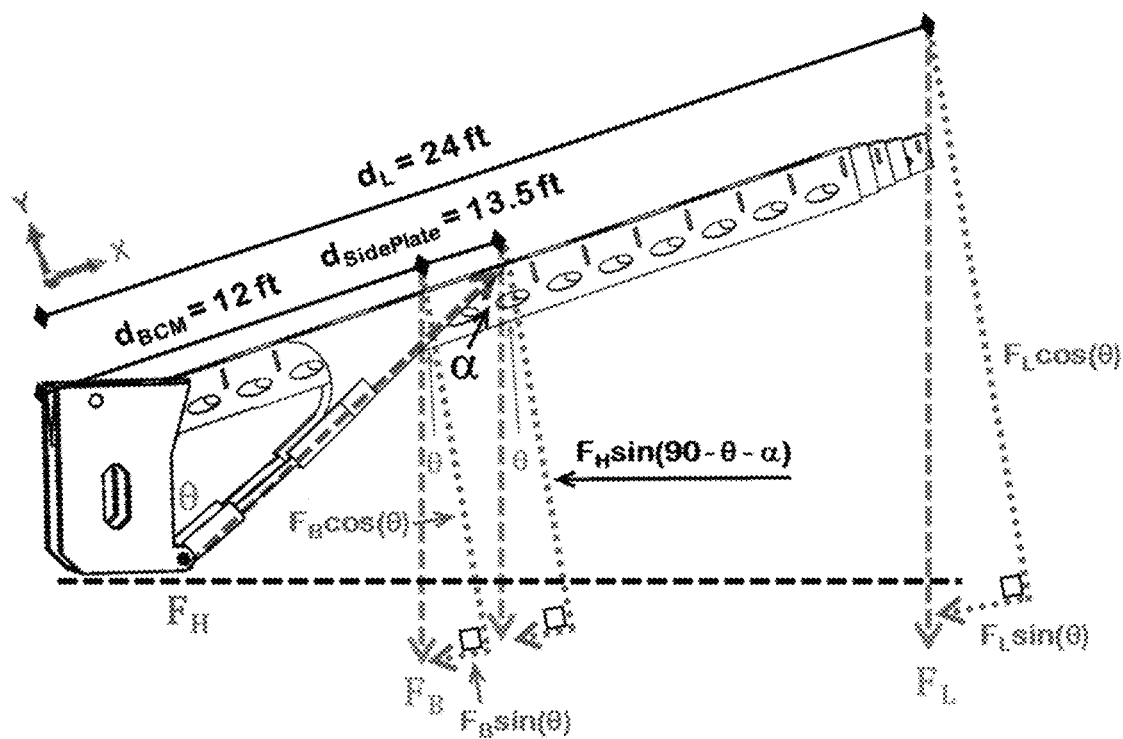
FIG. 17 illustrates a preferred embodiment of design calculation of FIG. 15.
Figure 18:
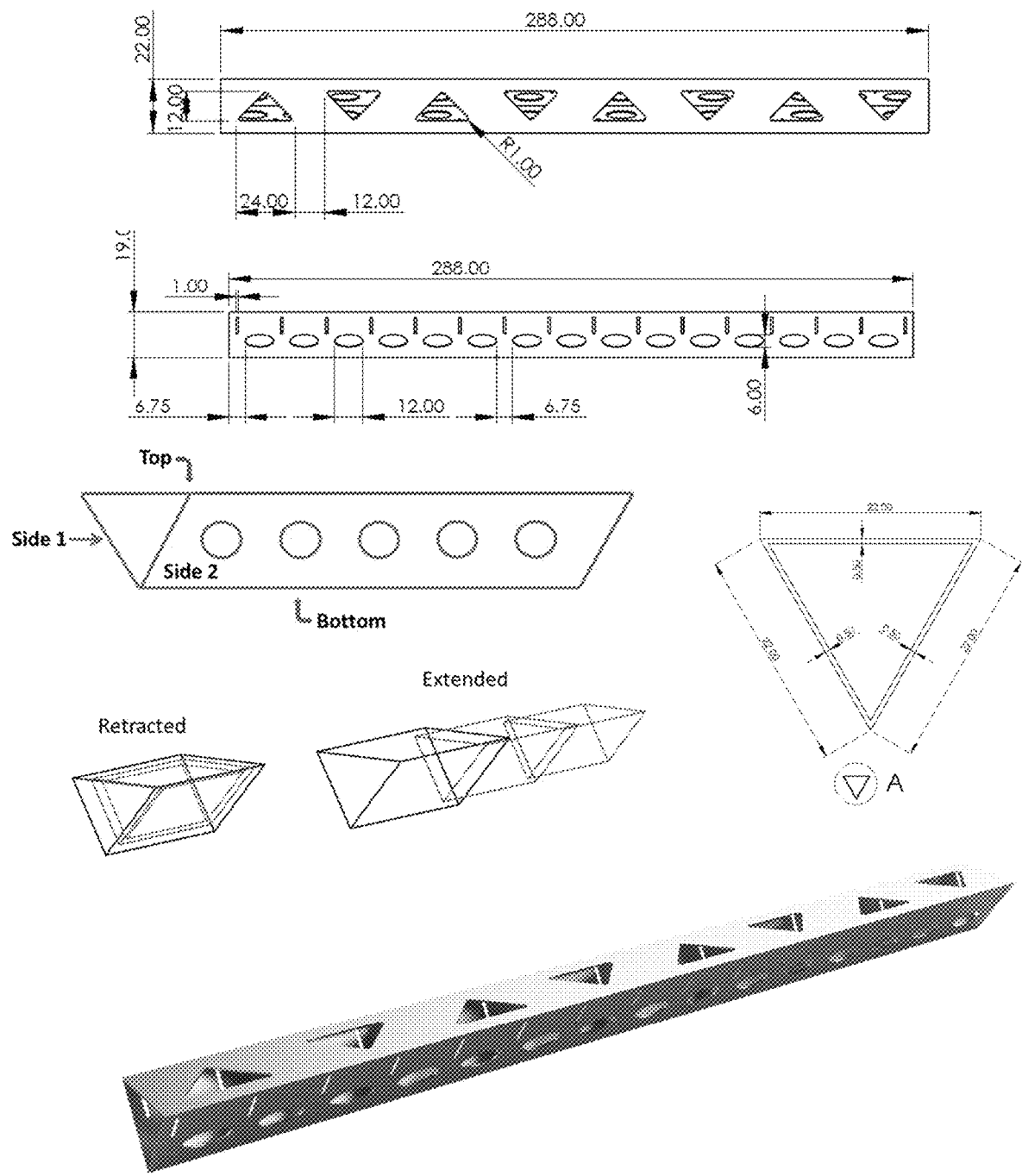
FIG. 18 illustrates yet further preferred embodiments of telescoping sections of the invention.

FIGS. 17 and 18 show some example calculations of nested telescoping sections measurement for use in various embodiments of the invention as contemplated.

As a further aspect of the invention, the entire conveying section apparatus complete with nested telescoping sections for material placement may, by itself, without rolling truck chassis be utilized as, for example, mounted or placed on any trailerable and/or movable platform to be brought to a work site as contemplated. Due to its compact size and weight, such inventive conveying apparatus is capable of accessing areas of desired use activity which is not possible for conventional truck or vehicle mounted on mountable material conveying apparatuses. Extreme weight reduction and size coupled with competitive material placement capacity provide advantages not previously thought possible in the various material placement industries.

In still yet an additional aspect of the invention each telescoping section 102-108, or more as desired or contemplated, and any other components, such as formed reinforcement joints or structural components as desired may be manufactured from engineering resins and thermoset resins, such as, for example, Metton liquid molding resin, or items manufactured by protrusion process utilizing fiber reinforcements as other resin matrixes to produce cross-sectional materials of extreme light weight and durability. As manufactured from such alternative commercially available materials, the design weights as shown in FIG. 15 and as calculated in FIG. 17 may be reduced appreciably, such as by one-third or more, for example, such as perhaps as much as 50%.

Although preferred embodiments of the present invention have been described it will be understood by those skilled in the art that the invention is not limited to the described preferred embodiments. Rather, various changes and modifications may and/or can be made within the spirit and scope of the invention.

I claim:

1. A portable conveying system which can be mounted on a pickup truck rolling chassis with engine and transmission components for conveying material to a desired site comprising a hydraulically operated telescopable conveying unit of a plurality of individual telescopable sections nesting in each other or extending out from each other when telescoping from a non-telescoping section and an internal extendable and retractable serpentine conveying belt situated within said telescopable conveying unit, and wherein said serpentine belt is mounted on a sliding roller system for compacted belt storage and foldable and storable as compacted on a plurality of rollers situated on said sliding roller system which system is movable forward and backward substantially horizontally to store and/or release said serpentine belt for conveyor use and said portable conveying system operated by a PTO function of the pickup truck chassis engine, and wherein said individual telescoping sections are moveable relative to each other.

2. The portable conveying system of claim 1, wherein the conveying belt extends and retracts on a substantially horizontally moveable track and operates within said telescoping sections to convey material to a desired site.

3. The portable conveying system of claim 1 wherein the telescoping sections are elevatable, and rotatable 360°.

4. The system of claim 3 wherein the telescoping sections are triangular in shape, the conveying belt weighs approximately 190 lbs. and the telescoping sections collectively weigh approximately 3,000 lbs., and can convey approximately 150 yards of material per hour.

5. The portable material conveying system of claim 4 which contains four telescoping sections and wherein the telescoping sections each weigh approximately 650 lbs., 480 lbs., 340 lbs., and 225 lbs., respectively.

6. The portable conveying system of claim 1 wherein said truck mounted system is of approximately 19,500 lbs. to approximately 23,000 lbs. gvw.

7. The portable conveying system of claim 1 wherein the telescoping sections reach a distance of approximately 100 feet when fully extended.

8. The portable conveying system of claim 1 which additionally contains a removable hopper means to load material to be conveyed.

9. The portable conveying system of claim 1 which is diesel powered.

10. The portable conveying system of claim 1 which is separately transferrable to be mounted on a rolling chassis.

* * * * *